US011166456B2

(12) United States Patent
Brown et al.

(10) Patent No.: US 11,166,456 B2
(45) Date of Patent: Nov. 9, 2021

(54) AGRICULTURAL FLUID DEPOSITION AID

(71) Applicant: Momentive Performance Materials Inc., Waterford, NY (US)

(72) Inventors: William L. Brown, Pleasantville, NY (US); George A. Policello, Ossining, NY (US); Jeferson A. Naue, Yorktown Heights, NY (US)

(73) Assignee: Momentive Performance Materials Inc., Waterford, NY (US)

( * ) Notice: Subject to any disclaimer, the term of this patent is extended or adjusted under 35 U.S.C. 154(b) by 46 days.

(21) Appl. No.: 16/151,941

(22) Filed: Oct. 4, 2018

(65) Prior Publication Data

US 2020/0107542 A1 Apr. 9, 2020

(51) Int. Cl.
*A01N 25/24* (2006.01)
*A01N 25/04* (2006.01)

(52) U.S. Cl.
CPC ............. *A01N 25/24* (2013.01); *A01N 25/04* (2013.01)

(58) Field of Classification Search
CPC ........ A01N 25/04; A01N 25/06; A01N 25/24; A01N 25/30
USPC .......................................................... 504/363
See application file for complete search history.

(56) References Cited

U.S. PATENT DOCUMENTS

| | | | | |
|---|---|---|---|---|
| 4,155,995 | A | 5/1979 | Heinz et al. | |
| 5,561,099 | A * | 10/1996 | Murphy | A01N 25/30 106/287.14 |
| 5,658,851 | A | 8/1997 | Murphy et al. | |
| 2001/0039321 | A1* | 11/2001 | Kennedy | A61K 8/894 528/10 |
| 2007/0032382 | A1* | 2/2007 | Volgas | A01N 25/32 504/101 |
| 2007/0197387 | A1 | 8/2007 | Polge | |
| 2014/0128265 | A1 | 5/2014 | Wacker | |
| 2014/0221300 | A1 | 8/2014 | Hofer et al. | |
| 2015/0282478 | A1 | 10/2015 | Baur et al. | |

FOREIGN PATENT DOCUMENTS

| | | | |
|---|---|---|---|
| EP | 0648413 | A1 | 4/1995 |
| EP | 2144499 | A1 | 1/2010 |
| WO | 2010043447 | A2 | 4/2010 |

OTHER PUBLICATIONS

H.W. Fox et al. (Polyorganosiloxanes . . . Surface Active Properties, Industrial and Engineering Chemistry, vol. 39, No. 11, Nov. 1947, pp. 1401-1409).*
Burghardt et al. (Pest Management Science, 62:137-147, 2006).*
Communication Relating to the Results of the Partial International Search for PCT/US2019/054009 dated Jan. 7, 2020.
Stevens P J G: "Organosilicone Surfactants as Adjuvants for Agrochemicals", Pesticide Science, Elsevier Applied Science Publisher. Barking, GB, vol. 38, No. 2/03, Jan. 1, 1993 (Jan. 1, 1993), pp. 103-122, XP000408739, ISSN: 0031-613X.
Naue et al. "New Organosilicone Surfactant for use as the Emulsifier, Spreader-Penetrant Component in MSO Based Adjuvants", Proceedings ISAA 2013, pp. 163-169.
Brown et al. "Organosilicone Spreader-Penetrant for use with Petroleum-Based Crop Oils" Proceedings ISAA 2016, pp. 45-52.

* cited by examiner

*Primary Examiner* — Johann R Richter
*Assistant Examiner* — Courtney A Brown
(74) *Attorney, Agent, or Firm* — Joseph S. Ostroff

(57) ABSTRACT

A deposition aid is provided, comprising a low molecular weight, low viscosity polysiloxane, combined with a crop oil concentrate or esterified seed oil concentrate.
Combinations including the modified silicone can improve spreading and/or adhesion to foliage. Adding about 5% to about 20% of the modified silicone can provide more than a proportional increase in spreading and/or adhesion.

21 Claims, 10 Drawing Sheets

Equilibrium Surface Tension of mineral oil/silicone oil mixtures

Equilibrium Surface Tension of Mixtures of OSIL-1 in MO-1

Equilibrium Surface Tension of methyl soyate/silicone oil mixtures

Droplet adhesion on Poinsettia Leaves
MO-1 content is qs. to 100%
Formulations tested as a 1.0% dispersion

Figure 9

AGRICULTURAL FLUID DEPOSITION AID

FIELD OF THE INVENTION

The invention relates generally to additives that can improve the deposition properties of certain fluids, and more particularly to formulations and methods for improving the deposition properties of fluids that are sprayed onto plant surfaces for agricultural purposes. Compositions in accordance with the invention are particularly useful with agrochemicals, more particularly with herbicides, insecticides, fungicides, biologicals and growth regulators.

BACKGROUND OF THE INVENTION

Many chemical formulations benefit from the inclusion of surfactants. For example, including certain surfactants in a chemical formulation can efficiently reduce the surface tension of the formulation. This can improve the ability of the formulation to adhere to the surface to which it is applied and for the same amount of the formulation to spread over a larger area of the surface. Therefore, in agriculture, adding the correct surfactants can promote improved adherence of the formulation to the plant to which it is applied and can help the same amount of an agrochemical formulation to cover a larger area of the plant.

Emulsifiable petroleum oils (crop oil concentrates or COCs) and emulsifiable methylated seed oils (MSOs) have long been used as agricultural spray adjuvants to enhance the performance of systemic pesticides and other agricultural chemicals. Crop oil concentrates and methylated seed oil concentrates generally contain surfactant packages that are designed to aid in emulsification and deposition properties. These oils are typically used to enhance the application and penetration of agricultural chemicals into plants, fungi and insects. The surfactants, in addition to oil emulsification, can improve spray deposition properties by reducing the surface tension of the dispersion or emulsion and thereby enhance droplet adhesion on foliar surfaces. As used herein, the term surfactant will include emulsifiers, dispersants and spreaders that affect the surface tension of compositions to which they are added.

However, it is desirable to further improve the spreading, adhesion and other properties of agricultural chemicals that include COCs and MSOs. Accordingly, an adjuvant composition is desirable that can improve the adhesion and spreading properties of agricultural pesticides beyond what is attainable using the prior art.

SUMMARY OF THE INVENTION

Generally speaking, in accordance with the invention, a spreading and deposition aid is provided. The aid can comprise a polysiloxane, such as a polydimethylsiloxane, an oil, and a surfactant. Low viscosity polysiloxanes having a low molecular weight are preferred, e.g., those having a molecular weight (as used herein, the molecular weight of silicone oils will refer to the number average molecular weight of those oils) below about 5000 g/mole, preferably below about 4000 g/mole, and more preferably, below about 2,000 g/mole. Preferred polysiloxanes have a kinematic viscosity below about 100 centistokes (cSt) at 25 degrees C., preferably below about 50 cSt at 25 degrees C., and more preferably below about 20 cSt at 25 degrees C. (ASTM D 445). Agricultural compositions in accordance with the invention can comprise a bioactive material in combination with the spreading and deposition aid discussed herein, comprising a polysiloxane component, an oil component, and a surfactant. Agricultural compositions in accordance with the invention can include crop oil concentrates (COCs) or methylated seed oil concentrates (MSOs). They can comprise 20% or less, preferably 10% or less of the polysiloxane. In these compositions, the polysiloxane serves to significantly improve the adhesion and/or spreading of the sprayed agricultural composition droplets on vegetation when compared to traditional COC and MSO containing compositions. The ratio of carbon to siloxane in these polysiloxanes should be sufficient to render them soluble or dispersible in the oil base stock.

An organosilicone-based agricultural composition for agricultural use in accordance with the invention can include a combination of (a) an oil component, (b) a surfactant; and (c) about 1% to 95% of a polysiloxane having a molecular weight below about 5,000, preferably below about 4,000 g/mole and a viscosity below about 100, preferably below about 50 cSt at 25° C., wherein the polysiloxane is soluble or dispersible in the oil component.

Compositions in accordance with the invention can increase the spreading or adhesion properties of an agricultural formulation when compared to the same formulation, but in the absence of the polysiloxane or organomodified polysiloxane.

The oil of this invention may be a petroleum oil, paraffinic oil, mineral oil, vegetable oil and/or esterified vegetable oil (e.g., methylated seed oil, methyl soyate, methylated rapeseed oil, methylated cottonseed oil, methylated palm oil, methylated corn oil) including naturally derived or synthetically prepared methyl, ethyl, propyl and isopropyl esters of C8 to C18 fatty acids, (e.g., isopropylmyristate, methyl oleate, ethyl oleate and methyl palmitate). The surfactant, dispersant and/or spreader of the deposition aid of this invention can include at least one surfactant derived from the ethoxylation or alkoxylation of primary or secondary alcohols. This includes surfactants selected from polyoxyethylene, polyoxypropylene, polyoxybutylene, and mixed polyalkyleneoxide alkoxylates of fatty alcohols. The surfactants may also include trisiloxane alkoxylates, alkyne diol alkoxylates, and blocked or random polyoxyethylene/polyoxypropylene copolymers.

Optionally the composition may also contain a solvent selected from d-limonene, triacetin, isopropylmyristate, esterified seed oil; or other suitable solvents.

BRIEF DESCRIPTION OF THE DRAWINGS

For a fuller understanding of the invention, reference is had to the following description, taken in connection with the accompanying drawings, in which:

FIG. 1 is a graph showing examples of the equilibrium surface tension of mineral oil/silicone oil mixtures;

FIG. 2 is a graph showing examples of the equilibrium surface tension of mixtures of OSIL-1 in MO-1;

FIG. 3 is a graph showing examples of the equilibrium surface tension of methyl soyate/silicone oil mixtures;

FIG. 4 is a graph showing examples of the effects of PDMS addition on the Dynamic Surface Tension (DST) of COCs;

FIG. 5 is a graph showing spread diameters of 0.5% dispersions in two examples;

FIG. 6 is a graph showing emulsion stability in two examples;

FIG. 7 is a graph showing examples of the effect of low MW PDMS on the foam volume of MSO adjuvants containing organosilicone superspreaders;

FIG. 8 is a graph showing examples of the equilibrium surface tension of Alkyl-Silicone/MO-1 Blends;

FIG. 9 is a graph showing examples of the droplet adhesion on poinsettia leaves among example formulations; and FIG. 10 is a graph showing examples of the effect of PDMs on Dynamic Surface Tension of COCs.

DETAILED DESCRIPTION OF THE PREFERRED EMBODIMENTS OF THE INVENTION

Figure 1:
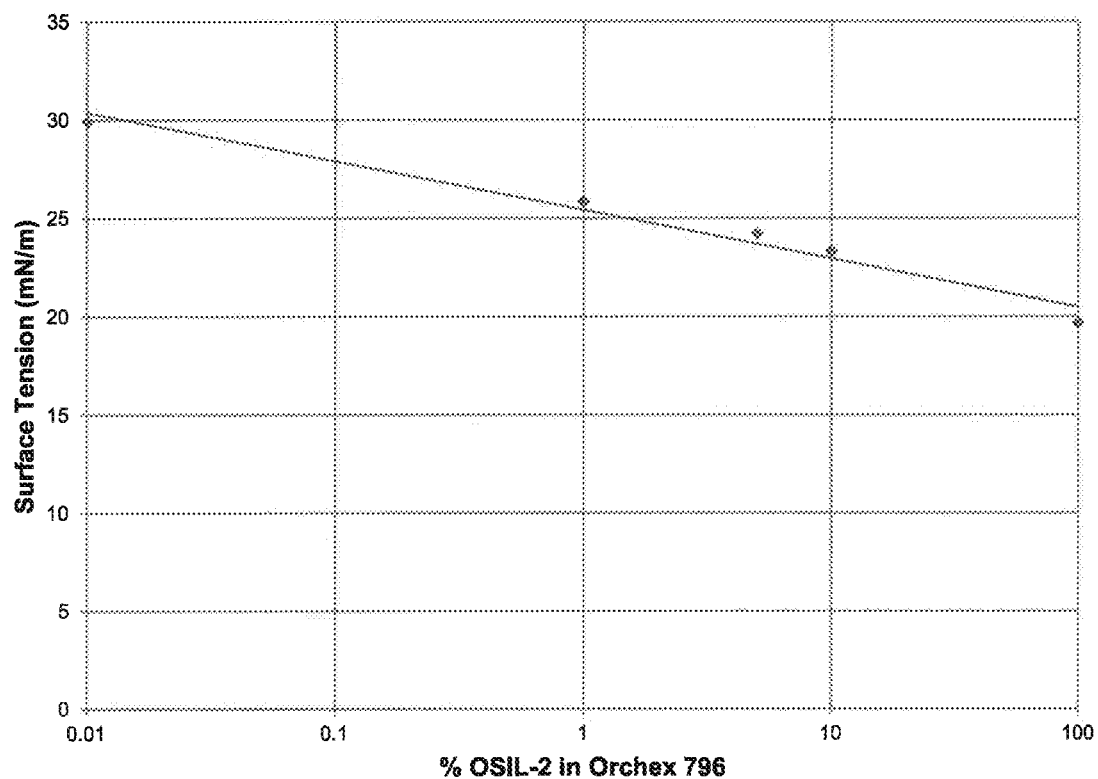

In the specification and claims herein, the following terms and expressions are to be understood as indicated.

The singular forms "a," "an," and "the" include the plural, and reference to a particular numerical value includes at least that particular value, unless the context clearly dictates otherwise.

Other than in the working examples or where otherwise indicated, all numbers expressing amounts of materials, reaction conditions, time durations, quantified properties of materials, and so forth, stated in the specification and claims are to be understood as being modified in all instances by the term "about".

All methods described herein may be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

No language in the specification should be construed as indicating any non-claimed element as essential to the practice of the invention.

The terms, "comprising," "including," "containing," "characterized by," and grammatical equivalents thereof are inclusive or open-ended terms that do not exclude additional, unrecited elements or method steps, but will also be understood to include the more restrictive terms "consisting of" and "consisting essentially of."

It will be understood that any numerical range recited herein includes all sub-ranges within that range and any combination of the various endpoints of such ranges or sub-ranges.

As used herein, integer values of stoichiometric subscripts refer to molecular species and non-integer values of stoichiometric subscripts refer to a mixture of molecular species on a molecular weight average basis, a number average basis or a mole fraction basis.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

The term "agrochemical," or "agricultural chemical," as used herein shall be understood to refer to all bioactive compounds, biological materials including extracts, fractions and by-products thereof, living organisms including microorganisms, and the like, that are suitable for agricultural use such as pesticides, herbicides, fungicides, insecticides, nematocides, larvacides, mitocides, ovacides, plant growth regulators, seed treatment agents, etc. "Agricultural composition" refers to a composition that is applied to plants, weeds, landscapes, grass, trees, pastures, or for other agricultural applications. Agricultural compositions can be provided in concentrated or diluted form. An agricultural composition may or may not contain an agrochemical (agricultural chemical).

The term "adjuvant" as used herein includes optional components that impart a functionally useful property to a composition, e.g., dispersing, wetting, spreading, etc., and/or enhances a functionally useful property already possessed in some degree by the composition, including any composition, material or substance which increases the efficacy of the agrochemical or active material to which it is added.

The term "bioactive" refers to an agricultural chemical or material having biological activity, i.e., a positive or negative effect on a living (plant, animal, bacterial or protozoan) organism, including but not limited to pesticides, e.g., herbicides, fungicides, insecticides, acaricides and molluscides; plant or animal nutrients; defoliants; and, plant or animal growth regulators.

The expression "hydrocarbon group" or "hydrocarbon radical" means any hydrocarbon from which one or more hydrogen atoms has been removed and is inclusive of alkyl, alkenyl, alkynyl, cyclic alkyl, cyclic alkenyl, cyclic alkynyl, aryl, aralkyl and arenyl groups and is inclusive of hydrocarbon groups containing at least one heteroatom.

The term "alkyl" means any monovalent, saturated straight, branched or cyclic hydrocarbon group; the term "alkenyl" means any monovalent straight, branched, or cyclic hydrocarbon group containing one or more carbon-carbon double bonds where the site of attachment of the group can be either at a carbon-carbon double bond or elsewhere therein; and, the term "alkynyl" means any monovalent straight, branched, or cyclic hydrocarbon group containing one or more carbon-carbon triple bonds and, optionally, one or more carbon-carbon double bonds, where the site of attachment of the group can be either at a carbon-carbon triple bond, a carbon-carbon double bond or elsewhere therein. Examples of alkyls include methyl, ethyl, propyl and isobutyl. Examples of alkenyls include vinyl, propenyl, allyl, methallyl, ethylidenyl norbornane, ethylidene norbornyl, ethylidenyl norbornene and ethylidene norbornenyl. Examples of alkynyls include acetylenyl, propargyl and methylacetylenyl.

The term "superspreader" as used herein refers to those adjuvant surfactants that have the property of "superspreading", or "superwetting". Superspreading/superwetting is the ability of a drop of a solution of a superspreader surfactant to spread to a diameter that is greater than the diameter of a drop of distilled water on a hydrophobic surface, and also greater than the diameter to which a solution of water and non-superspreading surfactant spreads on the hydrophobic surface.

The term "tank-mix" means the combination of at least one agrochemical with a spray medium, such as water or oil, at the point of use (application). The term "In-can" refers to a formulation or concentrate containing at least one agrochemical component. The "In-can" formulation may then be diluted to its application concentration at the point of use, typically in a tank-mix, or it may be used undiluted.

Crop oil concentrates (COCs) and methylated seed oils (MSOs) are classes of agricultural adjuvants that are based on petroleum oil and seed oil base stocks respectively. The COCs and MSOs contain surfactant packages that typically make up 5 to 40 percent of the product's composition. COCs and MSOs are sold neat and then diluted with water by the end-user before spraying. The surfactant packages act to disperse or emulsify the oil phase into the water, and to help the deposition (adhesion) and spreading of the sprayed emulsion or dispersion onto the target surface. COCs and MSOs can enhance the penetration of systemic pesticides and other agrochemicals into the plants, fungi and insects to which they are applied.

It has been determined that the addition of low molecular weight polysiloxanes (e.g. silicone oils) in accordance with the invention can further reduce the surface tension of the petroleum oil and seed oil base stocks that are used to make COCs and MSOs. The benefits (e.g., improved droplet adhesion, spreading, and/or emulsion stability) imparted to the COCs and the MSOs, and the resulting agricultural compositions containing these COCs and MSOs by the addition of the polysiloxane, can surprisingly exceed those expected from the agricultural formulations alone, i.e. without the polysiloxanes.

It was surprisingly determined that the sprayed droplets of the formulations containing the polysiloxanes had improved adhesion to plant (e.g., leaf) surfaces even where there was no associated reduction in the dynamic surface tension of the respective formulations. Furthermore, the high spreading of the emulsions described herein along with improved emulsion stability was also quite surprising.

Spreading and deposition aids in accordance with the invention can be formed by combining the following components: (a) 5% to 95%, preferably 50% to 90% of an oil component, (b) 1% to 50%, preferably 5% to 20% of an emulsifier, surfactant, dispersant or superspreader component; and (c) about 1% to 95%, preferably 2% to 20% and more preferably, 5% to 15% of a polysiloxane having a low molecular weight. Preferred polysiloxanes have a molecular weight of about 5000 g/mole or lower, preferably about 4000 g/mole or lower, more preferably 2000 g/mole or lower. The polysiloxane should have a viscosity below about 50 cSt, preferably below about 20 cSt at 25° C. The polysiloxane should be soluble or dispersible in the oil component. Preferred agricultural compositions in accordance with the invention can spread on or adhere to a leaf surface at least 10% better, preferably more than 20% better and more preferably at least 50% better than the same formulation will spread or adhere in the absence of the polysiloxane.

The oil component can be a mineral oil, a paraffinic crop oil, a vegetable oil, or an esterified seed oil and the polysiloxane is a polydimethylsiloxane or an organo-modified polysiloxane. Preferred oil components include: mineral oil, paraffinic oil, seed oil, soybean oil, corn oil, canola oil, rapeseed oil, sunflower oil, palm oil, cottonseed oil, methylated seed oil, methylated soybean oil, methylated rapeseed oil, methylated cotton seed oil, methylated corn seed oil, partially methylated seed oil, partially methylated soybean oil, methyl caprylate, methyl laurate, methyl myristate, methyl palmitate, methyl oleate, and methyl stearate.

Compositions of the invention can optionally be combined with one or more other adjuvant components known for incorporation in aqueous agricultural sprays. Among the many kinds of optional adjuvant are surfactants of both the organosilicon and non-organosilicon types and antifoam additives and additives like stickers, thickeners, dyes, and so forth.

Acceptable emulsifiers and surfactants include: nonionic, anionic, cationic and zwitterionic surfactants. Non-limiting examples of suitable nonionic surfactants include alcohol ethoxylates, alkylpolyglycosides, alkyleneoxide copolymers of ethyleneoxide with propyleneoxide, butyleneoxide, alkylpolyglycerols, acetylenic diol alkoxylates, and the like. Non-limiting examples of suitable anionic surfactants include alkylsulfates (e.g., sodium lauryl sulfate, sodium laurylethoxy sulfates and 2-ethylhexylsulfate), alkylbenzene sulfonates (e.g., sodium dodecylbenzene sulfonates), C8-C18 phosphate, mono-, di- and tri-esters with alkyleneoxide, alkyl sarcosinates such as sodium lauryl sarcosinate, and the like. Non-limiting examples of suitable cationic surfactants include C8-C18 alkoxylated fatty amines and imidazolines. Non-limiting examples of suitable zwiterionic surfactants include C8-C18 amidopropyl betaines, such as, but not limited to, lauryl betaine, myristyl betaine, lauramidopropyl betaine, soyamidopropyl betaine, laurylamido betaine, oleyl betaine, lecithins and the like. The agricultural composition can preferably include a fatty alcohol alkoxylate surfactant, e.g., polyoxyethylene, polyoxypropylene, polyoxybutylene, and mixed polyalkyleneoxide alkoxylates of fatty alcohols. Surfactants having short chain hydrophobes that do not interfere with superspreadingare described in U.S. Pat. No. 5,558,806, the entire contents of which are incorporated by reference herein, are also useful.

Specific acceptable examples include isodecyl alcohol ethoxylates (Alkosynt ID 30, Oxiteno, Rhodasurf DA 530, Solvay, Ethal DA-4, Ethox), isotridecyl alcohol ethoxylates (Genapol X 050, Genapol X 060, Genapol X 080, Clariant, Alkosint IT 60, Alkosint IT 120, Oxiteno), tridecyl alcohol ethoxylates (Lutensol TDA 6, Lutensol TDA 9, Lutensol TDA 10, BASF), guerbet alcohol alkoxylates (Lutenxol XL 50, Lutensol XP 50, Lutensol XL 60, Lutensol XP 60, Lutensol XL 80, Lutensol XP 80, BASF), secondary alcohol ethoxylates (Tergitol 15-S-3, Tergitol 15-S-5, Tergitol 15-S-7, Tergitol 15-S-9, Dow Chemical), polyethylene glycol trimethylnonyl ether (Tergitol TMN 3, Tergitol TMN 6, Tergitol TMN 10, Dow Chemical) alkyl acetylenic diols (Surfynols, Air Products), pyrrilodone based surfactants (e.g., Surfadone LP 100, Ashland), 2-ethyl hexyl sulfate, ethylene diamine alkoxylates (Tetronics, BASF), ethylene oxide/propylene oxide copolymers (Pluronics, BASF), gemini-type surfactants (Rhodia/Solvay) and diphenyl ether gemini-type surfactants (DOWFAX, Dow Chemical Preferred solvents include: isopropyl myristate, d-limonene, citrus terpene oil, or triacetin.

Preferred superspreaders include: siloxane polyalkyleneoxide copolymers. Non-limiting examples include polyoxyethylene, polyoxypropylene, polyoxybutylene, and mixed polyalkyleneoxide alkoxylates of trisiloxanes, tetrasiloxanes and pentasiloxanes.

Polysiloxanes in accordance with the invention can have the general formula (I), (II) or (III), below. The most preferred polysiloxanes are low viscosity polysiloxanes, e.g., up to 20 cSt, and/or up to an average MW of 2000 g/mol. Of the three formula, most preferred is general formula (I), especially with viscosities equal to or below about 20 cSt.:

$$M^1D_xD^1_yM^2 \quad \text{(I)}$$

wherein:

$M^1=R^1R^2R^3SiO_{1/2}$ $M^2=R^4R^5R^6SiO_{1/2}$ $D=R^7R^8SiO_{2/2}$ $D^1=R^9R^{10}SiO_{2/2}$ $R^1$, $R^2$, $R^3$, $R^4$, $R^5$ and $R^6$ are independently selected from a monovalent alkyl hydrocarbon radical of 1 to 18 carbons, and aryl or alkaryl hydrocarbon radicals of 6 to 14 carbon atoms;

$R^7$ and $R^8$ are independently selected from monovalent hydrocarbon radicals of 1 to 4 carbon atoms;

$R^9$ and $R^{10}$ are independently selected from a monovalent hydrocarbon radical of 1 to 18 carbons, and aryl or alkaryl hydrocarbon radicals of 6 to 14 carbon atoms; and subscripts x and y are independently 0 to 50, with the proviso that x+y is about 1 to 50.

Preferred structures of Formula (I) are those wherein Y=0 and all the R groups are methyl and the viscosity is 50 cSt or lower at 25 deg C., preferably 20 cSt or lower at 25 deg C. Other preferred examples of Formula I include those: wherein x+y is 5 to 50; wherein y=0 and x is 3 to 50; wherein $R^1$ to $R^8$ are methyl; wherein y=0, x=3 to 50, and $R^1$ to $R^8$ are methyl; wherein y=0 and x is about 5 to 25 and $R^1$ to $R^8$ are methyl; wherein $R^{10}$ is a monovalent alkyl hydrocarbon radical of 1 to 18 carbons, or an aryl or alkaryl hydrocarbon radical of 6 to 14 carbon atoms and $R^1$ through $R^9$ are methyl; wherein W and $R^4$ are monovalent alkyl hydrocarbon radicals of 1 to 18 carbons or aryl or alkaryl hydrocarbon radicals of 6 to 14 carbon atoms and $R^2$, $R^3$, and $R^5$ through $R^{10}$ are methyl; wherein $R^{10}$ is a monovalent alkyl hydrocarbon radical of 1 to 18 carbons, or an aryl or alkaryl hydrocarbon radical of 6 to 14 carbon atoms; or wherein $R^1$ through $R^9$ are methyl.

Polysiloxanes in accordance with this invention can also be defined by structure (II)

$$TS^1R^{11}TS^2 \qquad (II)$$

wherein, $TS^1$ and $TS^2$ are independently $R^{12}R^{13}R^{14}Si$—O—$Si^a$ ($R^4$)—O—$SiR^{15}R^{16}R^{17}$ wherein $Si^a$ is a monovalent radical and $R^{11}$ attaches to $Si^a$ $R^{11}$ is selected from divalent hydrocarbon radicals of 4 to 18 carbons, $R^4$, $R^{12}$, $R^{13}$, $R^{14}$, $R^{15}$, $R^{16}$ and $R^{17}$ are independently selected from monovalent hydrocarbon radicals of 1 to 4 carbons.

Preferred examples of formula II include examples wherein $R^H$ is a divalent hydrocarbon radical containing 4 to 18 carbons and wherein $R^4$ and $R^{12}$ through $R^{17}$ are methyl (—$CH_3$) groups.

Polysiloxanes in accordance with this invention can also be defined by structure (III)

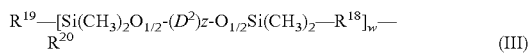

$$R^{19}\text{—[Si(CH}_3\text{)}_2O_{1/2}\text{-}(D^2)z\text{-}O_{1/2}\text{Si(CH}_3\text{)}_2\text{—}R^{18}]_w\text{—} \atop R^{20} \qquad (III)$$

wherein $R^{19}$=H—, $CH_3$—, or $HR^{18}$—

$R^{20}$=H—, or —Si(CH$_3$)$_2$O$_{1/2}$-(D$^2$)z-O$_{1/2}$Si(CH$_3$)$_2$H or —Si(CH$_3$)$_2$O$_{1/2}$-(D$^2$)$_z$-O$_{1/2}$Si(CH$_3$)$_2$CH$_3$, $R^{18}$ is selected from divalent hydrocarbon radicals of 4 to 18 carbons D$^2$=$R^{21}R^{22}$SiO$_{2/2}$, $R^{21}$ and $R^{22}$ are independently selected from monovalent hydrocarbon radicals of 1 to 4 carbons, z=2 to 20, and w=1 to 20 (w=1 or 2 is preferred).

Preferred examples of formula III include examples where w=1-10 and wherein $R^{21}$ and $R^{22}$ are methyl (—$CH_3$) groups.

The agricultural composition can preferably include a solvent selected from d-limonene, triacetin, isopropylmyristate, and esterified seed oil.

A method in accordance with the invention involves increasing the spreading and/or adhesion properties of an agricultural composition containing a mineral oil, a paraffinic crop oil, esterified seed oil or a vegetable oil, including COCs and MSOs, comprising adding to the agricultural composition, an effective amount of a selected polysiloxane or organo-modified polysiloxane having an average molecular weight below about 5000 g/mole, preferably below about 4000 g/mole, and more preferably, below about 2,000 g/mole. Preferred polysiloxanes have a kinematic viscosity below about 100 centistokes (cSt) at 25 degrees C., preferably below about 50 cSt at 25 degrees C., and more preferably below about 20 cSt at 25 degrees C. (ASTM D 445). Preferred polysiloxanes have general formulae I, II or III, identified above. The method can be effective to cause the composition to exhibit improved adhesion and/or spreading when compared to the same composition, but in the absence of the polysiloxane or organomodified polysiloxane. Increases of over 10%, 20% and even 50% improved spreading and/or adhesion are possible.

Deposition aids in accordance with the invention can be provided as an agricultural composition, blended on site from individual components, or a combination thereof. For example, they can be provided as isolated polysiloxanes or combined with other materials such as mineral oils, vegetable oils, esterified seed oils, surfactants and agrochemicals to form a tank mix, which can then be applied as desired.

Optimal amounts of the polysiloxane spreading and deposition aid for a specific spray composition and spraying operation can be readily determined employing routine experimental testing procedures known in the art. For many spray compositions, amounts of the compositions of this invention ranging from 0.01 to 5, and preferably from 0.05 to 1 weight percent can be incorporated therein with generally good spreading and adhesion results. Accordingly, the invention comprises an MSO and/or COC containing a polysiloxane as described herein, preferably at a concentration of 1-20% in the MSO or COC. The MSO or COC can then be diluted with water for agricultural purposes by the end user to make an emulsion or spray solution. The MSO or COC will typically make up 0.1 to 2 percent of this end use emulsion or spray solution.

Agricultural sprays, in addition to the compositions of the invention, can include one or more known and conventional active ingredients or agrochemicals of agricultural compositions, such as pesticides, fertilizers, and micronutrients.

Pesticidal sprays include at least one pesticide. Optionally, the pesticidal spray may include excipients, surfactants, solvents, foam control agents, deposition aids, biologicals, micronutrients, fertilizers, and the like. The term “pesticide” means any compound that is used to destroy pests, e.g., rodenticides, insecticides, miticides, acaricides, fungicides, herbicides, and so forth. Illustrative examples of pesticides that can be employed include, but are not limited to, growth regulators, photosynthesis inhibitors, pigment inhibitors, mitotic disrupters, lipid biosynthesis inhibitors, cell wall inhibitors, and cell membrane disrupters. The amount of pesticide employed in a spray composition will vary with the particular type of pesticide.

Specific examples of herbicidal and plant growth regulator compounds that can be incorporated in a spray composition include, but are not limited to: phenoxy acetic acids, phenoxy propionic acids, phenoxy butyric acids, benzoic acids, triazines and s-triazines, substituted ureas, uracils, bentazon, desmedipham, methazole, phenmedipham, pyridate, amitrole, clomazone, fluridone, norflurazone, dinitroanilines, isopropalin, oryzalin, pendimethalin, prodiamine, trifluralin, glyphosate, sulfonylureas, imidazolinones, clethodim, diclofop-methyl, fenoxaprop-ethyl, fluazifop-p-butyl, haloxyfop-methyl, quizalofop, sethoxydim, dichlobenil, isoxaben, bipyridylium compounds, and the like. Common and Chemical Names of Herbicides Approved by the Weed Science Society of America, *Weed Science,* 58:511-18 (2010) is incorporated herein by reference.

Specific examples of fungicidal compositions include, and are not limited to, aldimorph, tridemorph, dodemorph, dimethomorph; flusilazol, azaconazole, cyproconazole, epoxiconazole, furconazole, propiconazole, tebuconazole and the like; imazalil, thiophanate, benomyl carbendazim, chlorothialonil, dicloran, trifloxystrobin, fluoxystrobin, dimoxystrobin, azoxystrobin, furcaranil, prochloraz, flusulfamide, famoxadone, captan, maneb, mancozeb, dodicin, dodine, metalaxyl, and the like.

Specific examples of insecticide, larvacide, miticide and ovacide compounds that can incorporated in the aqueous spray compositions include, but are not limited to, *Bacillus thuringiensis* (or Bt), spinosad, abamectin, doramectin, lepimectin, pyrethrins, carbaryl, primicarb, aldicarb, methomyl, amitraz, boric acid, chlordimeform, novaluron, bistrifluoron, triflumuron, diflubenzuron, imidacloprid, diazinon, acephate, endosulfan, kelevan, dimethoate, azinphos-ethyl, azinphos-methyl, izoxathion, chlorpyrifos, clofentezine, lambda-cyhalothrin, permethrin, bifenthrin, cypermethrinrn, and the like.

Fertilizers and micronutrients include, but are not limited to, zinc sulfate, ferrous sulfate, ammonium sulfate, urea, urea ammonium nitrogen, ammonium thiosulfate, potassium sulfate, monoammonium phosphate, urea phosphate, calcium nitrate, boric acid, potassium and sodium salts of boric acid, phosphoric acid, magnesium hydroxide, manganese carbonate, calcium polysulfide, copper sulfate, manganese sulfate, iron sulfate, calcium sulfate, sodium molybdate, calcium chloride, and the like.

Buffers, preservatives and other standard agricultural excipients known in the art may also be included in the spray composition.

Agricultural spray compositions may be made by combining in any combination and/or sequence in a manner known in the art, such as mixing in water, one or more of the above spray components and the compositions of the present invention, either as a tank-mix, or as an "In-can" formulation.

The invention also comprises agricultural compositions of this invention, applied to and used to treat crop plants, landscapes and ornamentals, trees and pastures. They can also be used in forestry applications and on golf courses, to name a few examples. Crop plants include, for example, vegetable crops such as broccoli, cabbage, kale, spinach, onions and peppers; legumes such as beans, lentils, peas and soybeans; grain crops such as wheat, corn, barley, rye, rice and oats; flower crops such as roses, tulips, daisies, daffodils, *gerbera*, sunflowers, orchids, jasmine and carnations; root crops such as potatoes, beets, turnips, parsnips, radishes and carrots. Crop plants can further include fruits such as citrus, apples, tomatoes, grapes, watermelons, pears, raspberries, blueberries, plums, peaches, bananas, pineapples, strawberries, plantains, kiwis and mangoes; nut trees such as almonds, chestnuts, hazelnuts, hickory nuts, macadamia nuts, pecans, pine nuts, pistachios and walnuts. The agricultural compositions can also be applied to and used to treat pastures, such as clover, alfalfa and grasses, and crop plants such as squashes, tubers, zucchini, pumpkins as well as coconut, palm and cacao trees.

The agricultural compositions of this invention can be combined with herbicides and applied to and used to control weeds such as those listed below: *Anoda* (*Anoda cristata*), Balsamapple (*Momordica charantia*), Barley (*Hordeum vulgare*), Barnyardgrass (*Echinochloa crus-galli*), *Bassia* (*Bassia hyssopifolia*), Bittercress (*Cardamine* spp.), Bluegrass (*Poa bulbosa*), Brome (*Bromus tectorum*), Japanese brome (*Bromus japonicas*), Buttercup (*Ranunculus* spp.), Carolina foxtail (*Alopecurus carolinianus*), Carolina *geranium* (*Geranium carolinianum*), Castorbean (*Ricinus communis*), Chamomile (*Anthemis cotula*), Cheat (*Bromus secalinus*), Chervil (*Anthriscus cerefolium*), Chickweed (*Cerastium vulgatum*), Cocklebur (*Xanthium strumarium*), *Coreopsis* (*Coreopsis tinctoria*), Volunteer corn (*Zea mays*), Crabgrass (*Digitaria* spp.), Dwarfdandelion (*Krigia virginica*), Eastern mannagrass (*Glyceria* spp.), *Eclipta* (*Eclipta prostrata*), Falsedandelion (*Pyrrhopappus carolinianus*), Falseflax (*Camelina microcarpa*), Fiddleneck (*Amsinckia* spp.), Field pennycress (*Thlaspi arvense*), Annual Fleabane (*Erigeron annuus*), Hairy fleabane (*Conyza bonariensis*), Rough fleabane (*Erigeron strigosus*), Florida pusley (*Richardia scabra*), Foxtail (*Setaria* spp.), Jointed goatgrass, (*Aegilops cylindrical*), Goosegrass (*Eleusine indica*), Common groundsel (*Senecio vulgaris*), Henbit (*Lamium amplexicaule*), Horseweed (*Conyza Canadensis*), Itchgrass (*Rottboellia cochinchinensis*), Johnsongrass (*Sorghum halepense*), junglerice (*Echinochloa colona*), knotweed (*Polygonum* spp), *kochia* (*Kochia scoparia*), lambsquarters, (*Chenopodium album*), medusahead (*Taeniatherum caput-medusae*), morningglory (*Ipomoea* spp.), mustard, blue (*Chorispora tenella*), mustard, tumble (*Sisymbrium altissimum*), mustard, wild (*Sinapis arvensis*), oats, wild (*Avena fatua*), *panicum*, fall (*Panicum dichotomiflorum*), pigweed, redroot (*Amaranthus retroflexus*), pigweed, smooth (*Amaranthus hybridus*), prickly lettuce (*Lactuca serriola*), puncturevine (*Tribulus terrestris*), purslane, common (*Portulaca oleracea*), ragweed, common (*Ambrosia artemisiifolia*), ragweed, giant (*Ambrosia trifida*), rocket, London (*Sisymbrium irio*), Russian-thistle (*Salsola tragus*), rye, cereal (*Secale* cereal), ryegrass, Italian (*Lolium perenne*), sandbur, field (*Cenchrus spinifex*), *sesbania*, hemp (*Sesbania herbacea*), shattercane (*Sorghum bicolor*), shepherd's-purse (*Capsella bursa-pastoris*), sicklepod (*Senna obtusifolia*), signalgrass, broadleaf (*Urochloa platyphylla*), smartweed (Pennsylvania *Polygonum pensylvanicum*), sowthistle, annual (*Sonchus oleraceus*), Spanish needles (*Bidens bipinnata*), speedwell, corn (*Veronica arvensis*), speedwell, purslane (*Veronica peregrina*), sprangletop (*Leptochloa* spp.), spurge, annual (*Chamaesyce* spp.), spurge, prostrate (*Chamaesyce humistrata*), spurge, spotted (*Chamaesyce maculate*), spurry, umbrella (*Holosteum umbellatum*), stinkgrass (*Eragrostis cilianensis*), sunflower, common (*Helianthus annuus*), tansymustard, pinnate (*Descurainia pinnata*), teaweed/*sida*, prickly (*Sida spinosa*), Texas *panicum* (*Panicum* spp.), velvetleaf (*Abutilon theophrasti*), Virginia pepperweed (*Lepidium virginicum*), wheat (*Triticum aestivum*), witchgrass (*Panicum capillare*), woolly cupgrass (*Eriochloa villosa*), yellow rocket (*Barbarea vulgaris*).

Additional plants for receiving application of agricultural compositions in accordance with the invention include perennials, such as alfalfa, anise/fennel, bluegrass, Kentucky, clovers, dandelions, poison ivy, milkweed, poison-hemlock, thistles and grasses. Trees include alders, aches, beaches, aspens, cherries, elderberries, elms, hickories, honeysuckle, Kudzu, maples, oaks, pines, spruces, sumacs, ferns, creepers and poplars.

EXAMPLES

Aspects and attributes of preferred embodiments of the invention will be described with reference to the following examples, which are being presented for purposes of illustration only and should not be construed as limiting. In addition, unless otherwise indicated, as used in these examples, each of $R^1$ to $R^{10}$ can be considered to be methyl.

Product Descriptions Tables 1-4 describe the products used in the examples that follow.

TABLE 1

Organomodified Polysiloxanes

| ID | Formula | x, y, z and w | R | M.W. (g/mol) | Viscosity (cSt) |
|---|---|---|---|---|---|
| OSIL-1 | $M^1D_xD^1_yM^2$ | x = 8, y = 0, z = 0, w = 0 | $R^1$ to $R^8 = CH_3$ | 770 | 5 |
| OSIL-2 | $M^1D_xD^1_yM^2$ | x = 15, y = 0, z = 0, w = 0 | $R^1$ to $R^8 = CH_3$ | 1250 | 10 |
| OSIL-3 | $M^1D_xD^1_yM^2$ | x = 25, y = 0, z = 0, w = 0 | $R^1$ to $R^8 = CH_3$ | 2000 | 20 |
| OSIL-4 | $M^1D_xD^1_yM^2$ | x = 49, y = 0, z = 0, w = 0 | $R^1$ to $R^8 = CH_3$ | 3800 | 50 |
| OSIL-5 | $M^1D_xD^1_yM^2$ | x = 10, y = 5, z = 0, w = 0 | $R^1$ to $R^9 = CH_3$, $R^{10} = C_8H_{17}$ | 1846 | 47 |
| OSIL-6 | $M^1D_xD^1_yM^2$ | x = 10, y = 5, z = 0, w = 0 | $R^1$ to $R^9 = CH_3$, $R^{10} = C_{12}H_{25}$ | 2126 | * |
| OSIL-7 | $M^1D_xD^1_yM^2$ | x = 10, y = 0, z = 0, w = 0 | $R^1, R^2, R^4, R^5 = CH_3$, $R^3, R^6 = C_8H_{17}$ | 1132 | * |
| OSIL-8 | $M^1D_xD^1_yM^2$ | x = 10, y = 0, z = 0, w = 0 | $R^1, R^2, R^4, R^5 = CH_3$, $R^3, R^6 = C_{12}H_{25}$ | 1245 | * |
| OSIL-9 | $TS^1R^{11}TS^2$ | | $R^a$ and $R^{12}$ to $R^{17} = CH_3$, $R^{11} = C_8H_{16}$ | 587 | * |
| OSIL-10 | $R^{19}$-[—Si(CH$_3$)$_2$O$_{1/2}$-(D$^2$)z-O$_{i/2}$Si(CH$_3$)$_2$-R$^{18}$-]w- R$^{20}$ | x = 0, y = 0, z = 10, w = 2 | $R^{19}$ = H, $R^{18}$ = C$_8$H$_{17}$, $R^{20}$ = —Si(CH$_3$)$_2$O$_{1/2}$-(D$^2$)z-O$_{1/2}$Si(CH$_3$)$_2$H, $R^{21}$, $R^{22}$ = CH$_3$ | 2884 | * |

* - Not measured

TABLE 2

Organic Surfactants

| Surfactant | Designation in the Examples | Description | Vendor |
|---|---|---|---|
| Tergitol 15-S-3 | NIS-1 | Alcohol Ethoxylate | Dow |
| Tergitol 15-S-5 | NIS-2 | Alcohol Ethoxylate | Dow |
| Tergitol TMN-3 | NIS-3 | Alcohol Ethoxylate | Dow |
| Lutensol XL-50 | NIS-4 | Alcohol Ethoxylate/Propoxylate | BASF |
| Ecosurf EH-3 | NIS-5 | Alcohol Ethoxylate | Dow |
| Rhodasurf TR-5 | NIS-6 | Alcohol Ethoxylate | Solvay |
| Lumulse CO-5 | NIS-7 | Castor Oil Ethoxylate | Vantage |
| Triton X-100 | NIS-8 | Octylphenol ethoxylate | Dow |

TABLE 3

Organosilicone-containing Adjuvants

| Organosilicone surfactant | Designation in the Examples | Description | Vendor |
|---|---|---|---|
| Silwet 641 | OSS-1 | Blend of Nonionic Surfactant and Siloxane Polyalkyleneoxide Copolymer | Momentive |
| Surfactant Y | OSS-2 | Blend of Nonionic Surfactant and Siloxane Polyalkyleneoxide Copolymer | Momentive |

TABLE 4

Crop Oil Sources and Type

| Crop oil | Designation in the Examples | Description | Vendor |
|---|---|---|---|
| Orchex 796 | MO-1 | Mineral Oil | Calumet |
| Parol 80 | MO-2 | Mineral Oil | Penreco |
| Spray Oil 13 | MO-3 | Mineral Oil | Petro-Canada |
| CA 3040 | MS-1 | Methylated Soybean Oil | Chemical Associates |
| Methyl Soyate | MS-2 | Methylated Soybean Oil | Cargill |

Spreading Determination

The spreading ability of various compositions and formulations were evaluated by depositing a single drop (10 microliters) of emulsion (or other material) to be evaluated onto a clean, flat, polystyrene dish. The diameters of the resulting drops were then measured after 30 seconds. Each solution was tested 2 to 4 times and the average diameter was calculated. Alternatively, the spreading ability was also evaluated by depositing a single drop (10 microliters) of the sample to be evaluated onto a leaf surface. The area of the resulting drops was then measured after 3 minutes, unless otherwise specified. Each sample was tested 2 to 4 times and the average spread area was calculated.

Effect of PDMS Oils on Surface Tension when Blended with Oil Base Stocks

Low surface tension is beneficial to agricultural pesticide applications because it correlates with better droplet adhesion and spreading. The effect of polydimethylsiloxane (PDMS) oils on surface tension when blended with different oil base stocks was evaluated and the results are displayed in FIGS. 1, 2, and 3, which are log scales, such that a straight line actually indicates non-linear results. Thus, the results demonstrated that the addition of small amounts of silicone oil resulted in a disproportionately large reduction in equilibrium surface tension.

Figure 2:
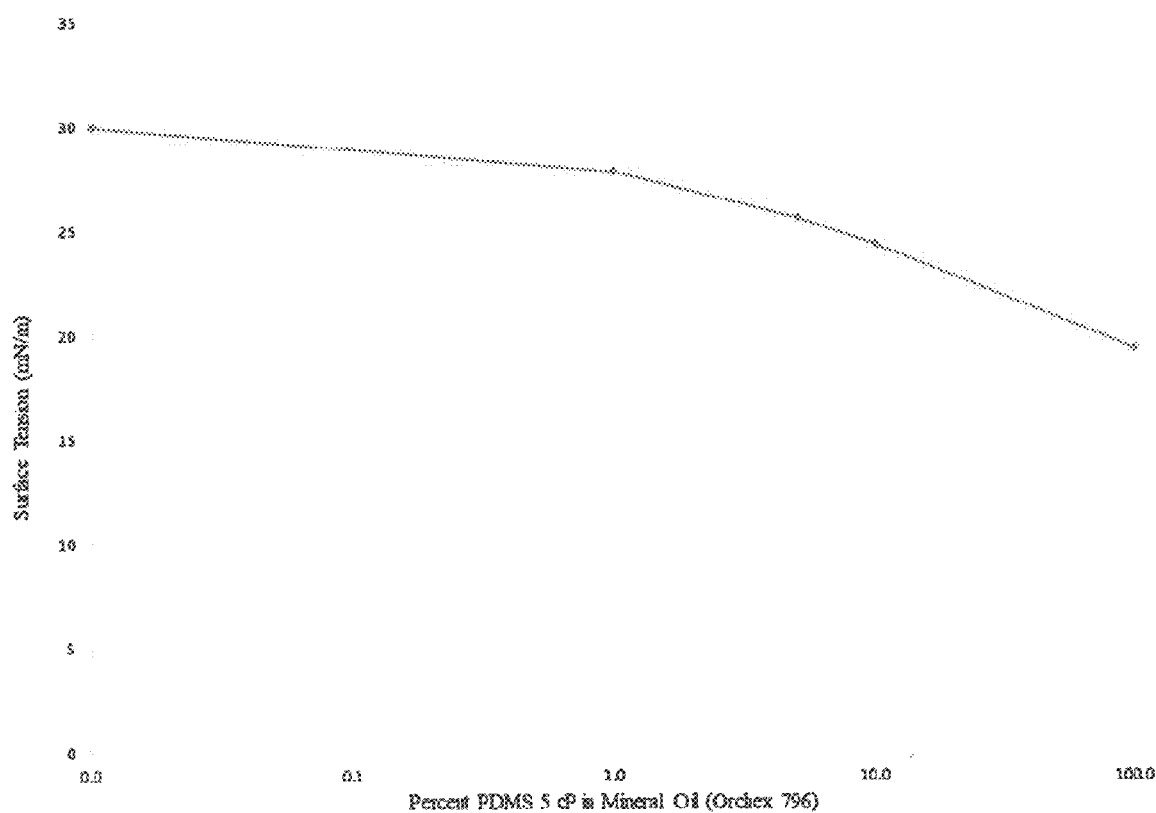

As can be seen in FIG. 1, the surface tension of the oil MO-1 dropped from 30 to 26 mN/m (more than 10% reduction) with the addition of only 1% of OSIL-2, a 10 cSt polydimethyl siloxane (PDMS) oil, identified as Element 14 10A, with an equilibrium surface tension of just below 20. The addition of only 10% OSIL-2 silicone oil reduced the surface tension of the blend more than half of the difference in surface tensions (30 and 20) to 23 mN/m. As used herein, all percentages are calculated on a weight basis. Similarly, as shown in FIG. 2, the addition of 10% (by wt) of OSIL-1, a 5 cSt PDMS oil, to MO-1 reduced the product's equilibrium surface tension from 29.1 mN/m to 24.3 mN/m. The addition of 10% (by wt) OSIL-3, a 20 cSt PDMS oil, to MO-3 resulted in a reduction in the product's surface tension from 30 mN/m to 22.8 mN/m.

Figure 3:
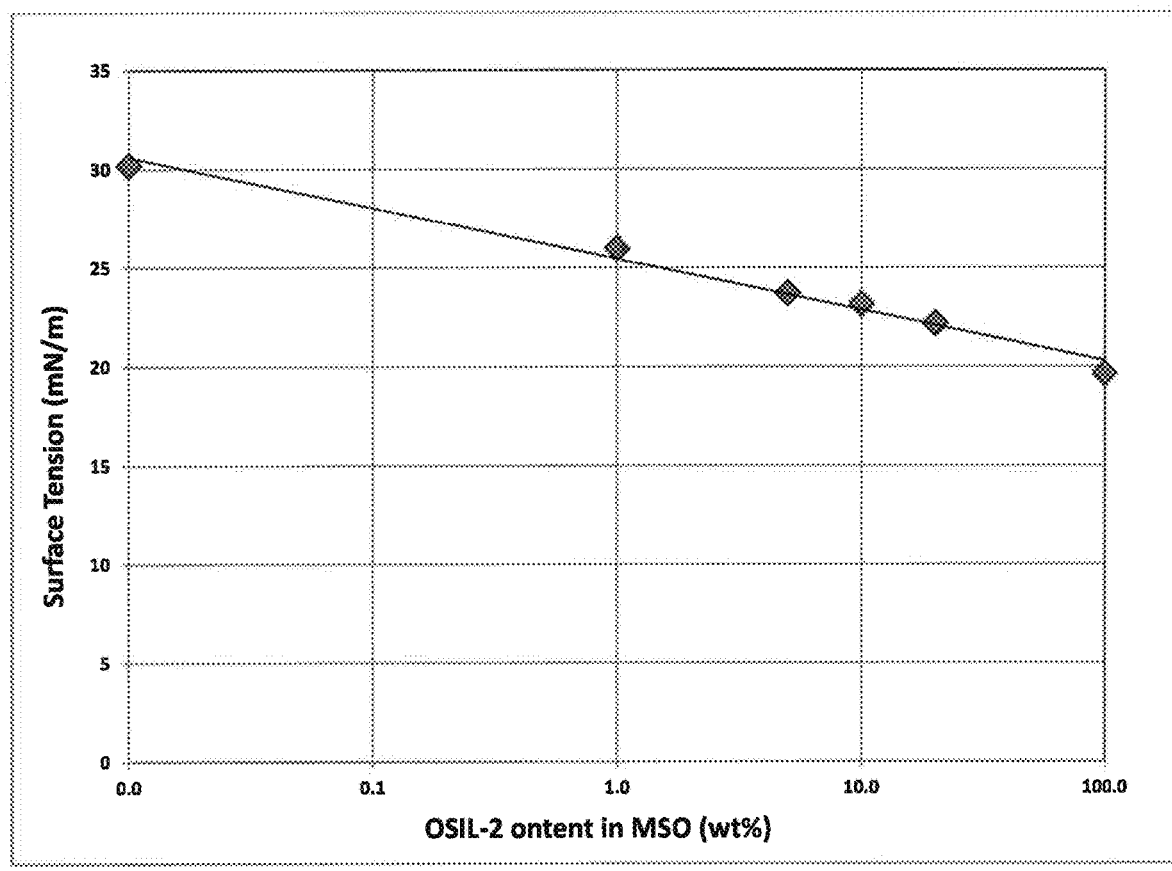
Figure 4:
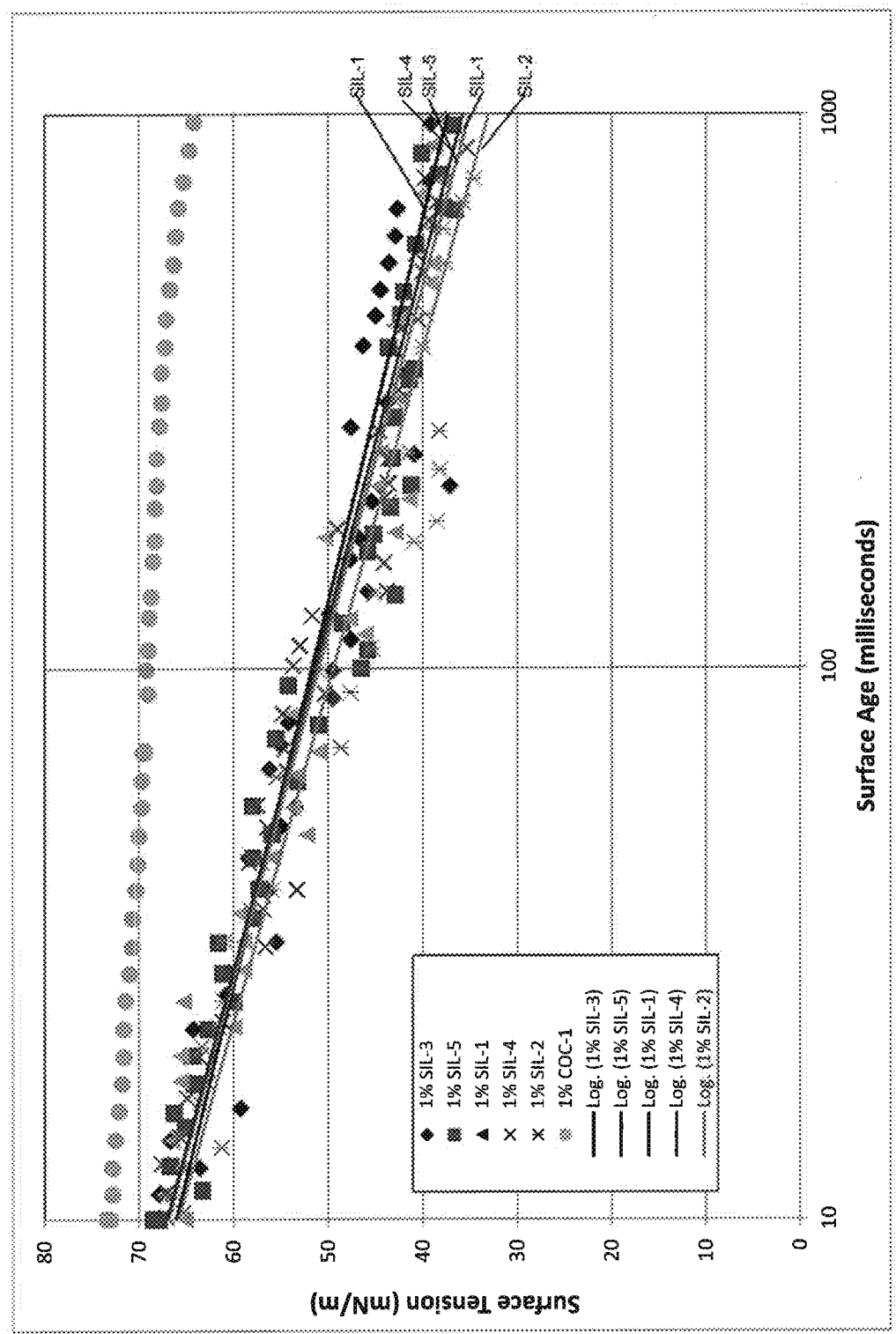

FIG. 3 shows that the addition of a low molecular weight silicone oil, OSIL-2, to an esterified seed oil, MS-1, also results in large reductions in surface tension with relatively small amounts of silicone oil. The addition of 1% OSIL-1 reduced surface tension of the methyl soyate from about 30 mN/m to about 26 and 10% reduced it to about 23 mN/m.

Crop oil concentrates (COCs) were formulated to evaluate the effect of low molecular weight, low viscosity PDMS oils in accordance with the invention on their foliar spreading and dynamic surface tension. The surfactant mixture SURF-1, defined in Table 5, was used in each of the formulations. A commercially available nonionic surfactant, Tergitol® 15-S-5, was added to two of the samples to increase the HLB value of the surfactant package. Tergitol® 15-S-3 and Tergitol® 15-S-5 are the 3 and 5 mole ethoxylates respectively of a mixture of C11-C15 secondary alcohols. Tergitol® TMN-3 is a 3 mole ethoxylate of trimethylnonyl alcohol. The results are summarized in Table 6.

TABLE 5

Surfactant Formulation Base Stock (SURF-1)

| Component | Wt % |
|---|---|
| NIS-1 | 46.70 |
| 1-decanol | 20.00 |
| 1-dodecanol | 20.00 |
| NIS-3 | 13.30 |

The data in Table 6 show that the addition of a PDMS oil (OSIL-2) in accordance with the invention to crop oil concentrate (COC) formulations surprisingly led to significant and sometimes very large increases in spreading on both poinsettia and philodendron leaves. This was surprising because the spreading of COC or MSO dispersions is typically driven by the surface tension of the aqueous phase of the sprayed droplet, not the equilibrium surface tension of the dispersed oil phase. The dynamic surface tension curves (DSTs) of the aqueous sprayed solutions, shown in FIG. 4, of SIL-1 through SIL-5 were all essentially the same, and all were significantly lower than the DST curve of the COC-1 dispersion. Thus, we expected SIL-1 through SIL-5 to give similar spread areas on the plant leaves, and expected all 5 to spread significantly more than the COC-1 dispersion. As expected, the COC-1 dispersion was the least effective spreader. However, surprisingly, the formulations containing the polysiloxane OSIL-2 all spread significantly better than their counterparts containing no silicone oil.

A benchmark crop oil concentrate, SIL-3, was made by blending 11.25% of the SURF-1 surfactant package into MO-1. In SIL-1, 10% OSIL-2 was added, replacing the same amount of MO-1. It can be seen in Table 6 that SIL-1 containing OSIL-2 almost doubled the spreading of the SIL-3 benchmark on poinsettia and increased the spreading on philodendron leaves by 12.5 percent.

A second benchmark COC formulation, SIL-5, was formulated. SIL-5 contains the SURF-1 surfactant package plus a small amount of surfactant NIS-2 to increase the HLB (hydrophilic to lipophilic balance) of the overall surfactant package. The polysiloxane OSIL-2 was added to this formulation to make COC formulation SIL-2. SIL-4 is a similar formulation that contains SURF-1, NIS-2 and OSIL-2. It can be seen in Table 6 that the polysiloxane-containing formulations SIL-2 and SIL-4 show 7.6 to 8 times more spreading on poinsettia leaves and 1.7 to 3.6 times more spreading on philodendron leaves than is achieved with SIL-5, the benchmark containing no polysiloxane oil.

TABLE 6

Effect of Silicone Oils on Leaf Coverage

| | SURF-1 | NIS-2 | OSIL-2 | MO-1 | Average spread area at 1.0% on plant leaves ($mm^2$) | | DST at 100 mS[1] for 1.0% soln. |
|---|---|---|---|---|---|---|---|
| Sample | Wt % | Wt % | Wt % | Wt % | Poinsettia | Philadendron | (mN/m) |
| SIL-1 | 11.25 | 0 | 10.00 | 78.75 | 110 | 63 | 52 |
| SIL-2 | 10.98 | 2.44 | 9.76 | 76.83 | 480 | 160 | 50 |
| SIL-3 | 11.25 | 0 | 0 | 88.75 | 56 | 56 | 52 |
| SIL-4 | 9.20 | 2.05 | 10.00 | 78.75 | 510 | 325 | 52 |
| SIL-5 | 10.98 | 2.44 | 0 | 86.58 | 63 | 90 | 52 |
| COC-1‡ | 100 | 0 | 0 | 0 | 20 | 25 | 69 |

‡COC-1 is Agri-Dex from Helena Chemical Co., a commercial benchmark crop oil concentrate To summarize, experimental COC formulations SIL-1 through SIL-5 all showed significantly enhanced spreading when compared to a 1% solution of COC-1, a commercially available crop oil concentrate. Moreover, whereas the dynamic surface tension curves of SIL-1 through SIL-5 are essentially the same, significantly improved spreading properties were unexpectedly observed with the formulations containing polysiloxanes. This indicates that the improved spreading was not merely the result of reduced surface tension, but an unexpected result of the silicone oils of the invention, especially when combined with the surfactant NIS-2. Thus, the addition of OSIL-2 had no significant effect on the DST (dynamic surface tension) of 1% solutions of these experimental COCs, but an unexpected increase in spreading (see Table 6).

Tables 7 and 8, below, show the effect of different PDMS oils in accordance with the invention, in combination with different surfactants, on foliar spreading in experimental COC formulations. As shown in these tables, the addition of silicone oils in accordance with the invention led to significant improvements in spreading with all of the surfactants, when tested on philodendron, bamboo, broccoli and poinsettia leaves. COC formulations SIL-21 and SIL-22 demonstrate that the improved spreading seen with the addition of OSIL-2 also occurs when the COC is formulated with a different oil base stock, in this case Parol® 80 (MO-2) instead of Orchex® 796 (MO-1).

The largest increases in foliar spreading were seen when the silicone oil was combined with the surfactants NIS-2 (SIL-7 and SIL-8), NIS-1 (SIL 16), NIS-4 (SIL-10) and NIS-6 (SIL-18). The 50 cSt PDMS oil (OSIL-4, Element 14 PDMS 50), used in formulation SIL-8, appeared to be at least as effective as, if not better than OSIL-2, as can be seen when comparing SIL-7 and SIL-8. However, the higher viscosity silicone oils are harder to solubilize and/or emulsify in crop oil concentrate formulations.

TABLE 7

Effect of Surfactant and PDMS on COC Spreading (1% dispersions)

| Sample | Surfactant (10 wt %) | PDMS (10 wt %) | MO-1 (q.s. 100) | Appearance | Spread area ($mm^2$) Philodendron Spread | Bamboo Spread | Broccoli Spread |
|---|---|---|---|---|---|---|---|
| SIL-6 | NIS-2 | | 90 | Clear | 27 | 20 | 240 |
| SIL-7 | NIS-2 | OSIL-2 | 80 | Clear | 142 | 581 | 705 |
| SIL-8 | NIS-2 | OSIL-4 | 80 | Clear | 260 | 352 | 1000 |
| SIL-9 | NIS-4 | | 90 | Hazy | 25 | 28 | 30 |
| SIL-10 | NIS-4 | OSIL-2 | 80 | Slight haze | 45 | 40 | 182 |
| SIL-11 | NIS-5 | | 90 | Hazy | 12 | 16 | 30 |
| SIL-12 | NIS-5 | OSIL-2 | 80 | Slight haze | 20 | 20 | 42 |
| COC-1 | — | — | — | Clear | 11 | 12 | 9 |

TABLE 8

Effect of Surfactant and PDMS on COC Spreading (1% dispersions)

| Sample | Surfactant (10 wt %) | OSIL-2 | Oil Base Stock (q.s.100) | Appearance | Emulsion stability | Spread area of 1% spray solutions after 5 min. ($mm^2$) Philodendron | Bamboo | Poinsettia |
|---|---|---|---|---|---|---|---|---|
| SIL-6 | NIS-2 | Nil[1] | 90% MO-1 | Slight haze | opaque/stable | 28 | 23 | 68 |
| SIL-7 | NIS-2 | 10% | 80% MO-1 | Clear | opaque/stable | 114 | 245 | 211 |
| SIL-13 | NIS-8 | Nil[1] | 90% MO-1 | Hazy | light gray/quick separation | 30 | 26 | 9 |
| SIL-14 | NIS-8 | 10% | 80% MO-1 | Hazy | light gray/quick separation | 30 | 30 | 16 |
| SIL-15 | NIS-1 | Nil[1] | 90% MO-1 | Clear | slight gray/stable | 31 | 23 | 43 |
| SIL-16 | NIS-1 | 10% | 80% MO-1 | Clear | slight gray/stable | 118 | 238 | 253 |
| SIL-17 | NIS-6 | Nil[1] | 90% MO-1 | Slight haze | opaque/stable | 27 | 25 | 68 |
| SIL-18 | NIS-6 | 10% | 80% MO-1 | Slight haze | opaque/stable | 98 | 45 | 107 |
| SIL-19 | NIS-7 | Nil[1] | 90% MO-1 | Hazy | slight gray/stable | 25 | 21 | 33 |
| SIL-20 | NIS-7 | 10% | 80% MO-1 | Hazy | slight gray/stable | 48 | 30 | 47 |

TABLE 8-continued

Effect of Surfactant and PDMS on COC Spreading (1% dispersions)

| Sample | Surfactant (10 wt %) | OSIL-2 | Oil Base Stock (q.s.100) | Appearance | Emulsion stability | Spread area of 1% spray solutions after 5 min. (mm$^2$) | | |
|---|---|---|---|---|---|---|---|---|
| | | | | | | Philodendron | Bamboo | Poinsettia |
| SIL-21 | NIS-2 | Nil[1] | 90% MO-2 | Slight haze | opaque/stable | 31 | 16 | 28 |
| SIL-22 | NIS-2 | 10% | 80% MO-2 | Clear | opaque/stable | 142 | 95 | 147 |

[1] no added alkyl silicone

The data in Table 9 show that the SIL-23, a COC formulation containing OSIL-1, increased the spreading on bamboo, philodendron and poinsettia leaf surfaces by approximately 3 times when compared to SIL-6, the non-silicone oil-containing benchmark.

TABLE 9

Effect of OSIL-1 and OSIL-2 on COC Spreading

| Sample | NIS-2 | PDMS | MO-1 | Appearance | Spread area of 1% spray solutions (mm$^2$) | | |
|---|---|---|---|---|---|---|---|
| | | | | | Bamboo | Philodendron | Poinsettia |
| SIL-6 | 10% | Nil[1] | 90% | light haze | 23 | 25 | 49 |
| SIL-23 | 10% | 10% OSIL-1 | 80% | Clear | 64.0 | 69 | 156 |
| SIL-7 | 10% | 10% OSIL-2 | 80% | Clear | 240 | 87 | 81 |

[1] no added alkyl silicone

Table 10, below, summarizes the results of spreading examples performed with 0.5% solutions of SIL-6 and SIL-7 (COCs made with MO-1, a paraffinic hydrocarbon oil, Orchex 796, from Calumet Specialty Chemicals) and SIL-24 and SIL-25 (MSOs made with MS-1, a methyl soyate, CA 3050, from Chemical Associates, A Division of Univar USA, Inc). With both base-stocks, the addition of a silicone oil (OSIL-2) in accordance with the invention significantly improved the foliar spreading properties of the product.

TABLE 10

Spreading of 0.5% COC spray solutions

| Sample | MO-1 | MS-1 | 10% NIS | 10% PDMS | Appearance (neat) | Emulsion stability (0.5%)*‡ | Leaf Wetting area (mm$^2$) of 0.5% Solutions‡ | | |
|---|---|---|---|---|---|---|---|---|---|
| | | | | | | | Philodendron | Bamboo | Broccoli |
| SIL-6 | 90 | | NIS-2 | | Clear | 5 | 20.0 | 27.0 | 96.0 |
| | | | | | | | 30.0 | 20.0 | 75.0 |
| SIL-7 | 80 | | NIS-2 | OSIL-2 | clear | 5 | 130.0 | 96.0 | 103.5 |
| | | | | | | | 112.0 | 108.0 | 140.0 |
| SIL-24 | | 90 | NIS-2 | | clear | 5 | 30.0 | 27.5 | 80.0 |
| SIL-25 | | 80 | NIS-2 | OSIL-2 | clear | 5 | 117.0 | 48.0 | 96.0 |
| COC-1 | | | | | clear | 9 | 9.0 | 9.0 | 7.5 |

*10 is opaque/milky white and very stable, 1 is almost clear with rapid separation

*Dispersibility of the 0.5% emulsion was quite good considering the low concentration ‡Except for COC-1 (Agri-Dex), which was tested at 1

Table 11 summarizes the results of spreading examples performed with 1.0% solutions of formulation containing OSIL-3, a 20 cSt polydimethysiloxane (PDMS) oil and NIS-2 in two different mineral oils (MO-1 and MO-3). SIL-6 and SIL-7 were used as benchmarks for formulation SIL-26. All three of these products are based on MO-1. Formulation SIL-27 was used as a benchmark for SIL 28. Both of these products are based on MO-3. With both oil base-stocks, the addition of a silicone oil in accordance with the invention significantly improved the foliar spreading properties of the product when compared to the same mineral oil containing only the nonionic surfactant NIS-2.

TABLE 11

Effect of OSIL-1 and OSIL-3 on COC Spreading

| | | | | Spread area of 1% spray solutions (mm²) | | |
|---|---|---|---|---|---|---|
| Sample | NIS-2 | PDMS | Oil Base Stock | Appearance | Bamboo | Philodendron | Poinsettia |
| SIL-6 | 10% | Nil[1] | 90% MO-1 | light haze | 25 | 33.5 | 80.5 |
| SIL-7 | 10% | 10% OSIL-2 | 80% MO-1 | clear | 158 | 77 | 110 |
| SIL-26 | 10% | 10% OSIL-3 | 80% MO-1 | clear | 115 | 168 | 210 |
| SIL-27 | 10% | Nil[1] | 90% MO-3 | clear | 25 | 35 | 172 |
| SIL-28 | 10% | 10% OSIL-3 | 80% MO-3 | Clear | 145 | 150 | 470 |

[1]no added alkyl silicone

Figure 10:
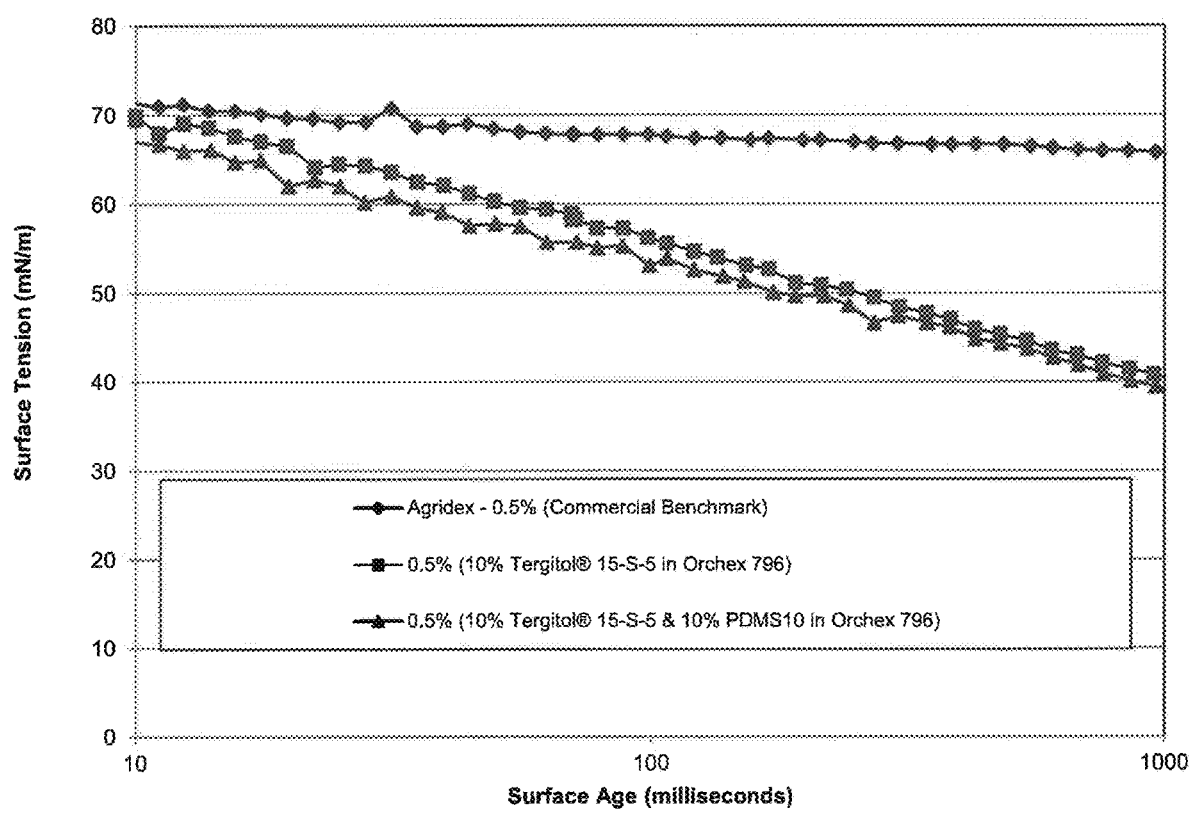

Adhesion tests performed with 0.5% aqueous solutions of Sil-6 and SIL-7 demonstrated the significant enhancement of the adhesion of formulations in accordance with the invention to foliage. Solution droplets were generated using a syringe pump and a Nisco Encapsulation Unit (Var J1) J1 employing a nozzle with an inner diameter of 0.41 mm. The data in Table 12 show that the addition of a the PDMS oil OSIL-2 to the COC formulation (SIL-6) increased the number of drops that adhered to the grass leaf surface approximately threefold, from 16.3 percent (SIL-6) to 45.9 percent (SIL-7). As can be seen in FIG. 10, both of these COC formulations presented essentially the same dynamic surface tension. Therefore, based on the understanding that droplet adhesion increases with decreasing dynamic surface tension (DST), the enhanced adhesion results seen here were unexpected.

TABLE 12

Droplet Adhesion on Barnyardgrass (*Echinochloa crus-galli*)

| Sample | Composition | Conc. (%) | Average % Adhesion | Stdev % |
|---|---|---|---|---|
| DI Water | — | | 3.1 | 2.7 |
| SIL-6 | 10% NIS-2 | 0.5 | 16.3 | 11.4 |
| | 90% MO-1 | | | |
| SIL-7 | 10% NIS-2 | 0.5 | 45.9 | 12.4 |
| | 80% MO-1 | | | |
| | 10% OSIL-2 | | | | water drop size ≈ 950 μm
COC drop size ≈ 700 μm
drop fall distance = 49.5 cm
drop impact velocity ≈ 2.5-3 m/s A similar droplet adhesion study was performed using a methylated seed oil (MSO) formulation, both with and without OSIL-2 (SIL-24 and SIL-25 respectively). Droplets of approximately 400 μm in diameter were generated at a height of 53 cm above a cabbage leaf surface. The leaves were mounted on a 22.5° slope. The percentage of impacted drops that adhered to the cabbage leaf surface was then determined. As was the case with the petroleum oil (mineral oil) based COCs in Table 12, the addition of silicone oil to the MSO unexpectedly and greatly improved the adhesion of the droplets onto the surface of a cabbage leaf. The results are summarized in Table 13, below.

TABLE 13

Adhesion of Adjuvant Solutions on the Cabbage Adaxial Leaf Surface

| Adjuvant treatment | Description | Conc. % w/v | Adhesion % |
|---|---|---|---|
| COC-1 | Agri-Dex | 0.5 | 47 |
| SIL-24 | 90% MS-1, 10% NIS-2 | 0.5 | 51 |
| SIL-25 | 80% MS-1, 10% NIS-2, 10% OSIL-2 | 0.5 | 74 |

Adhesion mean differences were statistically significant with 95% confidence (P0.05, LSD test).

Figure 5:
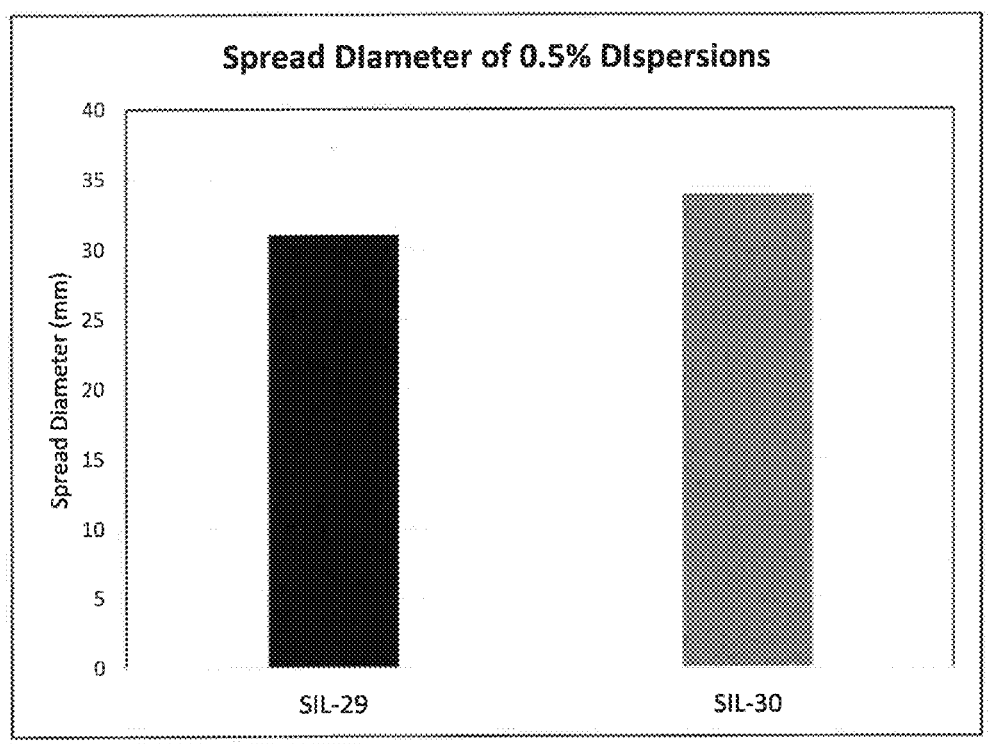
Figure 6:
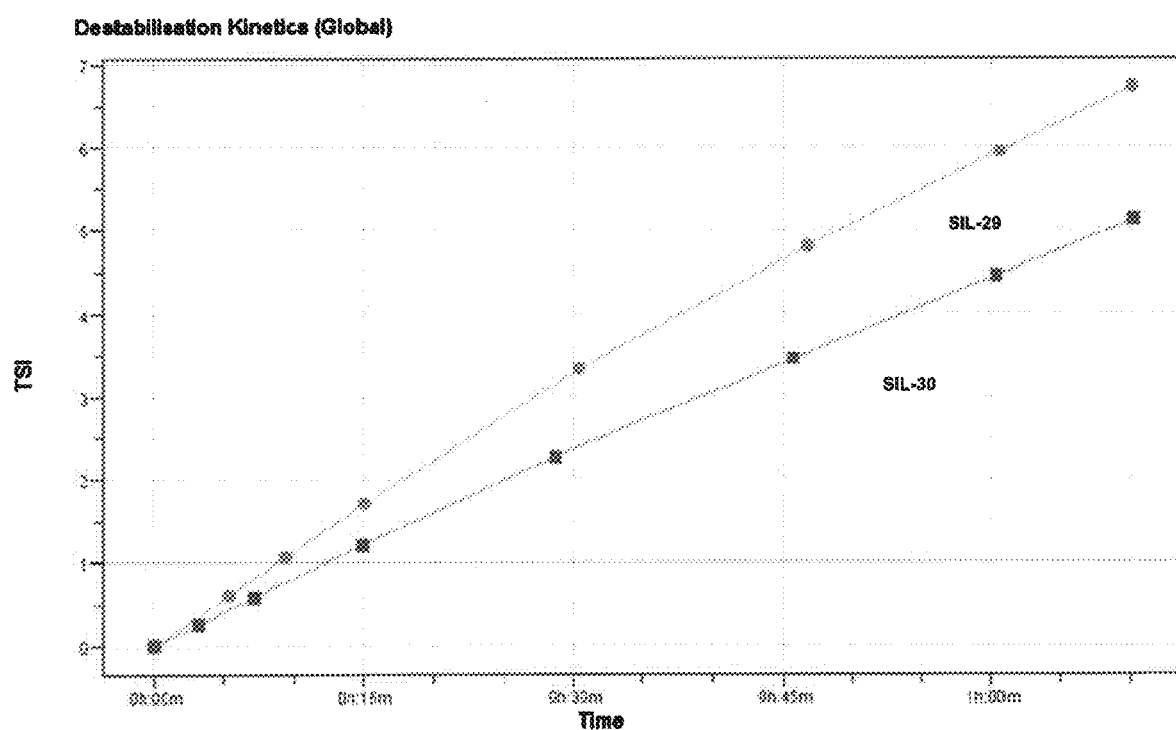

Referring to Table 14, below, Silwet 641 (OSS-1) is a surfactant mixture based on a superspreader (trisiloxane alkoxylate) organosilicone and some nonionic surfactants. It is typically added to an MSO base stock at concentrations ranging from 10 to 20 percent. Sample SIL-29 in Table 14 is a blend of 20 wt % OSS-1 and 80 wt % MS-1. Sample SIL-30 is a blend containing 20 wt % OSS-1, 70 wt % MS-1 and 10 wt % OSIL-2. Silwet 641 is often referred to as a superspreader and it has been believed to provide the best spreading properties obtainable. The data in Table 14 and FIGS. 5 and 6 demonstrate that the addition of the silicone oil in accordance with the invention lowered the equilibrium surface tension, increased the emulsion stability of the MSO concentrate to which it was added, and surprisingly increased the spread diameter of the product. Note that in FIG. 6, TSI measures emulsion separation, such that a lower TSI corresponds to increased emulsion stability.

TABLE 14

Blends of PDMS, Nonionic & Organosilicone Surfactants in MSO

| Sample | OSS-1 (wt %) | OSIL-2 (wt %) | MS-1 (wt %) | EST at 0.5% (mN/m) | Spread Diameter at 0.5% (mm) |
|---|---|---|---|---|---|
| SIL-29 | 20 | 0 | 80 | 22.9 | 31.0 |
| SIL-30 | 20 | 10 | 70 | 22.5 | 33.9 |

A similar study was performed by adding a silicone oil to an MSO adjuvant formulation and evaluating the product's spray coverage. Instead of measuring the spread diameter over a hydrophobic surface, a dozen sprays were performed with 0.5% spray solutions of samples SIL-31 and SIL-32. The solutions were sprayed at a pressure of 20 psig using a Unijet® 8002E flat-fan nozzle. These spray conditions equate to a field spray volume of 100 L/ha. The coverage achieved on a square of water sensitive paper was determined for each spray. The average spray coverage for each product was then calculated. The results are summarized in Table 15. The data show that an increase in spray coverage was achieved through the addition of low molecular weight silicone oil (polysiloxane) in accordance with the invention to the MSO formulation with SIL-32 (with OSIL-2) providing better coverage than the SIL-31 that contains no PDMS oil.

TABLE 15

Spray Coverage of Surfactant Blends in MSO Adjuvants

| Sample | OSS-1 (wt %) | OSIL-2 (wt %) | MS-2 (wt %) | Average covered area (%) with 0.5% spray solutions |
|---|---|---|---|---|
| SIL-31 | 20 | 0 | 80 | 47.3 |
| SIL-32 | 20 | 20 | 60 | 52.1 |

The impact of the compositions of the present invention on droplet adhesion of spray solutions was tested on difficult-to-wet barnyardgrass (*Echinochloa crus-galli*), following the methodology previously described by Gaskin et al. (Stevens, P J, Kimberley, M O, Murphy, D S, & Policello, G A; Adhesion of spray droplets to foliage: the role of dynamic surface tension and advantages of organosilicone surfactants, Pesticide Science, Vol. 38, 1993, pp. 237-245. Forster, W A, Mercer, G N and Schou, W C, Process-driven models for spraydroplet shatter, adhesion or bounce, In: Baur P, Bonnet M, editors. Proceedings 9th International Symposium on Adjuvants and Agrochemicals. ISAA978-90-815702-1-3; 2010). Droplets with a diameter ca. 400 μm were impacted from a height of 53 cm, to leaves mounted at 22.5 degrees from horizontal. The droplet adhesion was compared to the dynamic surface tension of the respective formulations. The composition of samples SIL-33 through SIL-36 are shown in Table 16.

TABLE 16

Preparation Examples of Agricultural Deposition Aids

| Components | SIL-33 | SIL-34 | SIL-35 | SIL-36 |
|---|---|---|---|---|
| AgroSpred 820 | 100.00 | | | |
| OSS-2 | | 20.00 | 20.00 | 20.00 |
| OSIL-2 | | | 10.00 | 10.00 |
| d-limonene | | | | 20.00 |
| MS-1 | | 80.00 | 70.00 | 50.00 |
| Total | 100.00 | 100.00 | 100.00 | 100.00 |

AgroSpred 820 is a MSO concentrate made of 20 wt % Silwet 641 and 80% MS-1

The barnyard grass adaxial leaf surface is extremely difficult to wet. Therefore, this is a good target for comparative droplet adhesion studies. Table 17 gives the droplet adhesion reported as the percentage of impacted droplets retained on the leaf surface. As can be seen in Table 17, the compositions of the present invention gave an unexpectedly large increase in droplet adhesion relative to the commercial benchmark AgroSpred 820 (20 wt % Silwet 641, 80 wt % MSO) and relative to the SIL-34 benchmark that contains no PDMS oil. This unexpected improvement is associated with the use of the 10 cSt PDMS oil OSIL-2. The level of improvement, exceeding a twofold increase in droplet adhesion, is a surprising and unexpected result given the small to insignificant differences observed in the DST at typical impact times (between 50 and 250 milliseconds).

TABLE 17

Adhesion of Adjuvant Treatments on Barnyardgrass (BYDG) Foliage.

| Adjuvant treatment | Conc. (%) | Surface Tension as a function of Interface Development Time | | | Adhesion (%) on BYDG |
|---|---|---|---|---|---|
| | | 50 msec | 100 msec | 250 msec | |
| SIL-33 | 0.5 | 47.2 | 44.3 | 40.8 | 25 |
| SIL-34 | 0.5 | 49.0 | 46.2 | 41.1 | 12 |
| SIL-35 | 0.5 | 49.0 | 45.5 | 39.6 | 54 |
| SIL-36 | 0.5 | 51.7 | 47.0 | 41.8 | 62 |

Figure 7:
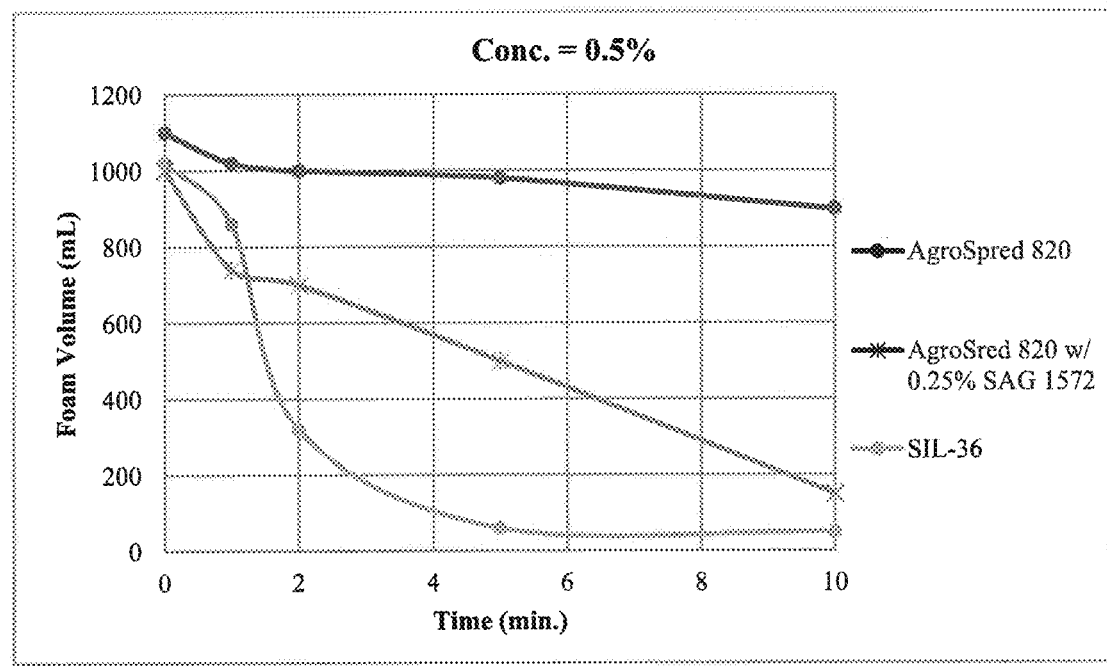
Figure 8:
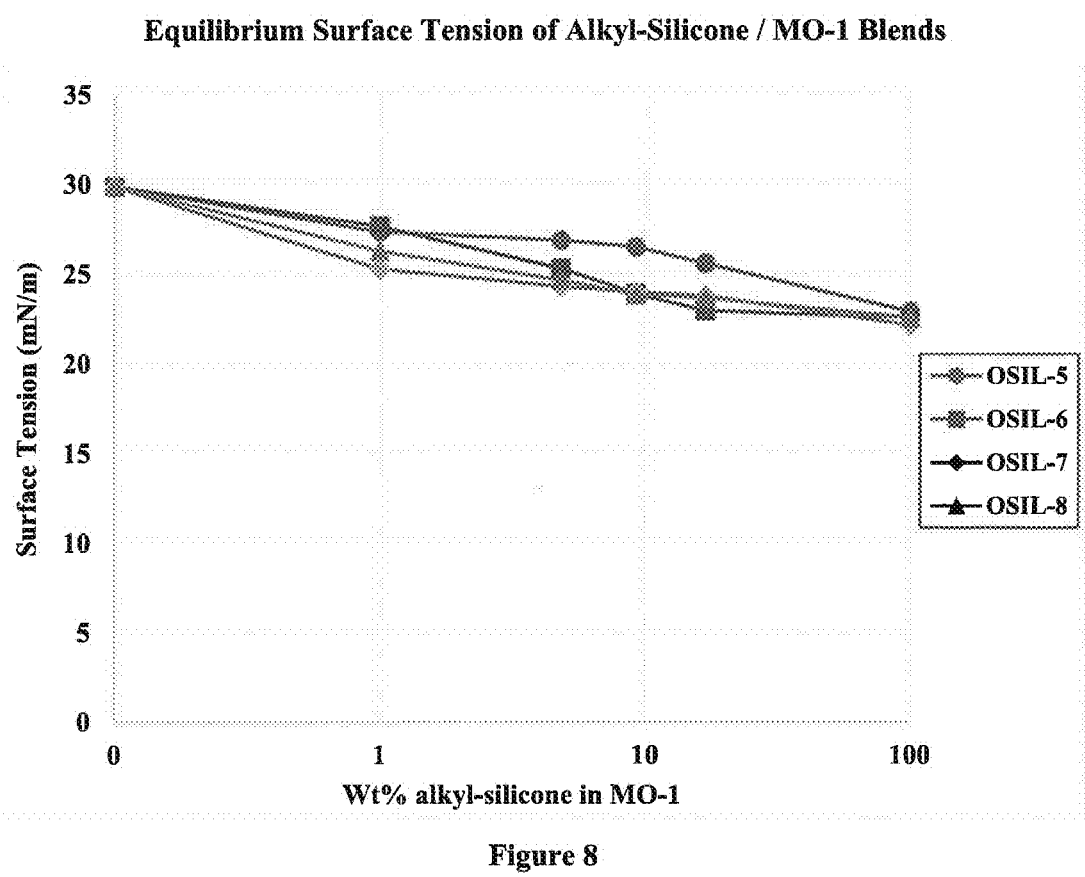

Also tested was the effect of low MW PDMS oil on the foam volume of MSO concentrates. FIG. 7 shows the foam volume determined by a sparge test. In this test, nitrogen is bubbled in the spray solution employing a metal frit at a rate of 1.0 L/min for 1 min. The foam volume is measured at initial (point at which bubbling stops), 1, 2, 5 and 10 minutes. As can be seen, the low MW PDMS oil reduced the foam levels below what can be achieved with the use of a high-performance antifoam (e.g., SAG-1572 available from Momentive Performance Materials). This result was unexpected because the presence of trisiloxane alkoxylates typically render commercial antifoams ineffective at typical use rates, a result associated with the low equilibrium surface tension delivered by organosilicone superspreaders.

As described above the addition of low concentrations (1-20%) of low molecular weight, low viscosity polydimethylsiloxanes (silicone oils) in accordance with the invention to COCs and MSOs significantly reduced the surface tension of the petroleum oil and seed oil base stocks. The presence of the silicone oil also enhanced the adhesion of the sprayed COC and MSO droplets to foliar surfaces. Furthermore, the addition of these low molecular weight silicone oils to the crop oil concentrate and MSOs unexpectedly led to much improved spreading on a variety of leaf surfaces, while also improving the emulsion stability and reducing the foam volume.

Note that a limiting factor can be the poor solubility of the PDMS oils in the crop oil-base stocks. The results below describe examination of the effect of a variety of alkyl-silicone oils on the performance of COCs and MSOs. All of the alkyl-silicone oils evaluated here showed good solubility in both mineral oils and methylated seed oils and significantly reduced the equilibrium surface tension of the resulting COCs and MSOs. Additionally, all of the alkyl-silicone oils enhanced the spreading of the COCs and MSOs on plant leaves. The tested alkyl modified silicones are set forth below.

Alkyl Modified Silicones. The Alkyl Groups are Either C8 or C12.

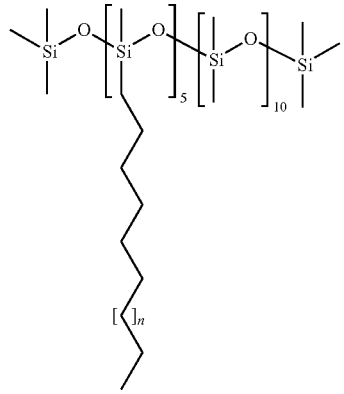

n = 0 or 4
OSIL-5 (n = 0) and OSIL-6 (n = 4)

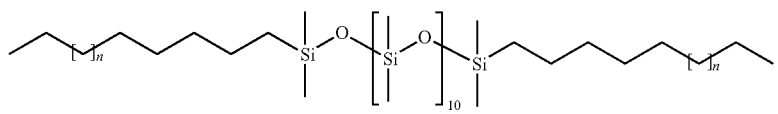

n = 0 or 4
OSIL-7 (n = 1) and OSIL-8 (n = 5)

OSIL-9

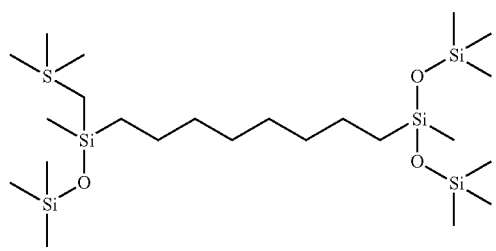

OSIL-10

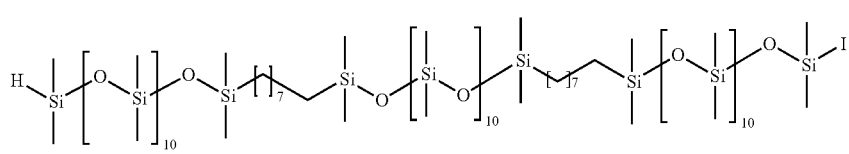

The solubility of the alkyl silicone oils in a typical mineral oil and a methylated seed oil were first determined. The effect of the alkyl-silcones on the equilibrium surface tension of blends with the crop oil base stocks was then measured. Finally, the spreading characteristics of simple COC and MSO formulations containing the alkyl modified silicone oils were determined.

OSIL-5, OSIL-6, OSIL-7 and OSIL-8 all exhibited good solubility in MO-1. The equilibrium surface tension of these neat alkyl silicone oils was then determined. They had surface tensions of between 22 and 23 mN/m (see Table 18), which is significantly lower than the surface tension of neat MO-1, which is 29.9 mN/m.

The effect of alkyl silicone concentration on the equilibrium surface tension of MO-1 was determined. The addition of 10% OSIL-5 to MO-1 resulted in a significant surface tension reduction, from 29.9 to approximately 26 mN/m. For OSIL-6 through OSIL-8, the addition of 10% of alkyl silicone to MO-1 reduced the surface tension to below 24 mN/m. This is similar to the surface tension reduction achieved when adding OSIL-2 to MO-1. It was observed that even though the compositions of the present invention are able to reduce the equilibrium surface tension of the neat oil blends, such reduction was not always observed for the aqueous dispersions of the respective oil-based formulations. Additionally, no significant variation is observed in the dynamic surface tension (DST) of the spray solutions containing COCs or MSOs with and without the compositions of the present invention. One skilled in the art would expect the droplet adhesion of those formulations to be equivalent since droplet adhesion usually correlates with dynamic surface tension; however, the incorporation of the compositions of the present invention gave increased droplet adhesion even though there was no significant reduction in DST. This observation was unexpected and surprising. Data for solubility of alkyl silicones in MSO and EST determinations are summarized in Table 18. Surface tension vs. alkyl silicone concentration curves are shown in FIG. 8.

TABLE 18

Solubility and Equilibrium Surface Tension of Alkyl-Silicone in MSO

| Alkyl silicone | Solubility at 10% in MO-1 | EST neat (mN/m) | EST of MO-1 blends (the percentage indicates the amount of alkyl silicone in wt %, MO-1 qs 100) | | | |
|---|---|---|---|---|---|---|
| | | | 1.0 wt % | 4.8 wt % | 9.2 wt % | 16.8 wt % |
| OSIL-5 | clear, colorless solution, no separation | 22.9 | 27.4 | 26.9 | 26.5 | 25.6 |
| OSIL-6 | clear, colorless solution, no separation | 22.6 | 27.8 | 25.3 | 23.9 | 23.0 |
| OSIL-7 | clear, colorless solution, no separation | 22.2 | 25.3 | 24.3 | 24.0 | 23.8 |
| OSIL-8 | clear, colorless solution, no separation | 22.6 | 26.3 | 24.7 | 23.9 | 23.7 |

Samples of crop oil concentrates (COCs) based on MO-1 and 10% of the nonionic surfactant NIS-2 were formulated to determine the effect of the alkyl silicones, in accordance with the invention, on spreading. A 10:90 blend of surfactant in oil was used as a benchmark. The COC formulations and the spreading of 1 percent dispersions of these products are shown in Table 19. All of the COC formulations containing alkyl silicone oils spread significantly better than the NIS-2/MO-1 control (SIL-41) on philodendron and bamboo leaves.

TABLE 19

Effect of Alkyl Silicones on the Spreading of NIS-2/MO-1 Blends (1% dispersions)

| Sample | MO-1 (wt %) | NIS-2 (wt %) | Alkyl silicone (10% wt) | Spread Area (mm²) | | | |
|---|---|---|---|---|---|---|---|
| | | | | Philodendron After 15 min | Philodendron After 80 min | Bamboo After 15 min | Bamboo After 80 min |
| SIL-37 | 80 | 10 | OSIL-5 | 38 | 38 | 25 | 41 |
| SIL-38 | 80 | 10 | OSIL-6 | 43 | 40 | 25 | 35 |
| SIL-39 | 80 | 10 | OSIL-7 | 70 | 80 | 58 | 76 |
| SIL-40 | 80 | 10 | OSIL-8 | 72 | 86 | 45 | 56 |
| SIL-41 | 90 | 10 | — | 27 | 30 | 24 | 27 |

A similar set of data was generated to see how these four alkyl silicones behaved in MS-1. Table 20 shows the solubility and equilibrium surface tension of the alkyl-silicones blended with MS-1. All four products exhibited good solubility in the methyl soyate base oil. The effect of different concentrations of alkyl silicones OSIL-6 and OSIL-7 on the equilibrium surface tension of MS-1 was determined and both alkyl silicones reduced the surface tension of CA-1 by more than 5 mN/m at a concentration of 10 percent.

TABLE 20

Solubility and Equilibrium Surface Tension of Alkyl-Silicones in MS-1

| Alkyl-silicone | Solubility at 10% in MS-1 | ST (neat) mN/m | EST (mN/m) at X % in MS-1 | | | |
|---|---|---|---|---|---|---|
| | | | 1% | 5% | 10% | 20% |
| OSIL-6 | clear, light yellow, no separation | 22.6 | 25.9 | 25.4 | 23.7 | 22.6 |
| OSIL-7 | clear, light yellow, no separation | 22.2 | 25.4 | 24.5 | 23.3 | 22.9 |
| Nil[1] | — | 29.9 | — | — | — | — |

[1]MS-1 with no alkyl-silicone oil

Methylated seed oil concentrates (MSOs) based on MS-1 were prepared. They contained 10 wt % NIS-2, 10 wt % alkyl silicone, and 80 wt % MS-1. A 10:90 blend of surfactant NIS-2 in seed oil MS-1 was used as a benchmark. The MSO formulations and the spreading of 1 percent dispersions of these products are shown in Table 21. Both of the MSO formulations containing alkyl silicones spread significantly better than the SIL-44 benchmark after 15 and 120 minutes of spreading. (except for the SIL-42 dispersion which was equivalent to the control on philodendron after 2 hours).

TABLE 21

Effect of Alkyl Silicones in the Spreading of NIS-2/MS-1 Blends (1% dispersions)

| | | | Alkyl | Spread Area (mm$^2$) | | | |
|---|---|---|---|---|---|---|---|
| Sample | MS-1 (wt %) | NIS-2 (wt %) | silicone (10% wt) | Philodendron 15 min | Philodendron 120 min | Bamboo 15 min | Bamboo 120 min |
| SIL-42 | 80 | 10 | OSIL-6 | 36 | 46 | 37 | 49 |
| SIL-43 | 80 | 10 | OSIL-7 | 36 | 72 | 25 | 132 |
| SIL-44 | 90 | 10 | none | 20 | 46 | 20 | 28 |

Table 22 shows the effect of OSIL-9 and OSIL-10 on the equilibrium surface tension of MO-1. Both of these alkyl-silicones significant reduce the surface tension of the oil at relatively low concentrations.

TABLE 22

Equilibrium Surface Tension of blends of MO-1 with Alkyl Silicones

| Alkyl silicone | Solubility at 10% in MO-1 | Equilibrium Surface Tension (mN/m) at X % in MO-1 | | | | | |
|---|---|---|---|---|---|---|---|
| | | 0% | 1% | 5% | 10% | 20% | 100% |
| OSIL-9 | clear, colorless solution, no separation | 29.9 | 29.1 | 25.4 | 25.2 | 23.7 | 21.7 |
| OSIL-10 | clear, colorless solution no separation | 29.9 | 24.0 | 23.4 | 23.5 | 22.5 | 21.8 |

Samples of a crop oil concentrate containing OSIL-9 and OSIL-10 were made up. A 10:90 blend of NIS-2 in MO-1 was again used as a benchmark. The spreading of 1 percent dispersions of these products was determined on polystyrene plates, philodendron leaves and bamboo leaves. The results are summarized in Table 23. The composition of this invention, SIL-45, gave very superior spreading to the benchmark sample, SIL-47. SIL-46, also a composition of this invention, showed significantly better spreading than the SIL-47 benchmark on the leaf surfaces.

TABLE 23

Effect of alkyl Silicones in the Spreading of NIS-2/MO-1 Blends (1% dispersions)

| | | | Alkyl | Spread Area (mm$^2$) | | | | |
|---|---|---|---|---|---|---|---|---|
| Sample | MO-1 (wt %) | NIS-2 (wt %) | silicone (10% wt) | Polystyrene 30 sec | Philodendron 15 min | Philodendron 2 hrs | Bamboo 15 min | Bamboo 2 hrs |
| SIL-45 | 80 | 10 | OSIL-9 | 40 | 38 | 38 | 42 | 42 |
| SIL-46 | 80 | 10 | OSIL-10 | 90 | 96 | 182 | 210 | 164 |
| SIL-47 | 90 | 10 | Nil[1] | 45 | 30 | 30 | 25 | 34 |

[1]no added alkyl silicone

OSIL-9 and OSIL-10 were also evaluated in MS-1. Both products exhibited good solubility in the seed oil. The effect of different concentrations of these two alkyl silicones on the equilibrium surface tension of the methyl soyate was determined and are shown in Table 24.

TABLE 24

Equilibrium Surface Tension of Blends of MS-1 with Alkyl Silicones

| Alkyl silicone | Solubility at 10% in MS-1 | Surface Tension (neat) (mN/m) | Surface Tension (mN/m) at X % in MS-1 | | | | | |
|---|---|---|---|---|---|---|---|---|
| | | | 0% | 1% | 5% | 10% | 20% | 100% |
| OSIL-9 | clear, light yellow fluid, no separation | 21.7 | 30.2 | 28.4 | 29.2 | 24.6 | 22.6 | 21.7 |
| OSIL-10 | clear, light yellow fluid, no separation | 21.8 | 30.2 | 24.9 | 24.4 | 24.0 | 23.9 | 21.8 |

An MSO concentrate was formulated with 10 wt % NIS-2, 10 wt % OSIL-10 and 80 wt % MS-1. A 10:90 blend of the NIS-2 surfactant in seed oil MS-1 was used as a control. The formulations and the spreading of 1 percent dispersions of these products are shown in Table 24. The alkyl-silicone containing formulation, SIL-48, gave very good spread on all surfaces tested and was far superior than the control formulation, SIL-49.

TABLE 25

Effect of Alkyl Silicones in the Spreading of NIS-2/MS-1 Blends (1% dispersions).

| Sample | MS-1 (wt %) | NIS-2 (wt %) | Alkyl silicone (10% wt) | Spread Area (mm$^2$) | | | | |
|---|---|---|---|---|---|---|---|---|
| | | | | Polystyrene 30 sec | Philodendron 15 min | Philodendron 2 hrs | Bamboo 15 min | Bamboo 2 hrs |
| SIL-48 | 80 | 10 | OSIL-10 | 50 | 42 | 64 | 35 | 126 |
| SIL-49 | 80 | 10 | Nil[1] | 13 | 11 | 25 | 36 | 84 |

[1]no added alkyl silicone

FIG. 9 shows the droplet adhesion of some of the compositions of the present invention tested on poinsettia leaves. Results are expressed as the average percent of impacting droplets that were retained over the leaf surface. As can be seen, the compositions of the present invention deliver a significantly higher droplet deposition rate than the benchmark COC formulation.

The following examples comprise alkyl silicones in MSO formulations containing organosilicone superspreaders. The MSO samples that were evaluated consisted of 70 wt % MS-1, 20 wt % OSS-1, and 10 wt % of the alkyl modified silicones. These MSO compositions are described in Table 26. Table 26 also shows the effect of the alkyl silicones on the foam volume of seed oil concentrates containing organosilicone superspreaders. As can be seen, the composition of the present invention delivers lower foam volumes when combined with organosilicone superspreaders in seed oil concentrates.

TABLE 26

Effect of Alkyl Silicones on the Foam Volume (sparge test) of Methylated Seed Oil Concentrates Containing Organosilicone Superspreaders.

| Sample | MS-1 (wt %) | OSS-1 (wt %) | Alkyl silicone (10% wt) | Foam volume 0 min | 1 min | 2 min | 5 min | 10 min |
|---|---|---|---|---|---|---|---|---|
| AgroSpred 820 | 80 | 20 | — | 1100 | 1020 | 1000 | 980 | 900 |
| SIL-50 | 70 | 20 | OSIL-5 | 1110 | 1080 | 1040 | 940 | 500 |
| SIL-51 | 70 | 20 | OSIL-6 | 1110 | 1020 | 980 | 900 | 500 |
| SIL-52 | 70 | 20 | OSIL-7 | 1090 | 1000 | 960 | 900 | 550 |
| SIL-53 | 70 | 20 | OSIL-8 | 1150 | 1060 | 1040 | 920 | 500 |
| SIL-54 | 70 | 20 | OSIL-9 | 1110 | 1040 | 960 | 780 | 220 |
| SIL-55 | 70 | 20 | OSIL-10 | 1110 | 1050 | 950 | 800 | 250 |

While the invention has been described with reference to particular embodiments, those skilled in the art will understand that various changes may be made and equivalents may be substituted for elements thereof without departing from the scope of the invention. It is intended that the invention not be limited to the particular embodiments disclosed, but that it include all embodiments falling within the scope of the appended claims.

What is claimed is:

1. An organosilicone-based agricultural composition, comprising a combination of (a) an oil component, (b) a surfactant; and (c) a polysiloxane having an average molecular weight of about 4,000 g/mole or lower and a viscosity of about 50 cSt or lower at 25° C., wherein the polysiloxane is soluble or dispersible in the oil component and has the general formula (I'):

$$M^1D_xD^1_yM^2 \quad (I')$$

wherein:

$M^1=R^1R^2R^3SiO_{1/2}$ $M^2=R^4R^5R^6SiO_{1/2}$ $D=R^7R^8SiO_{2/2}$ $D^1=R^9R^{10}SiO_{2/2}$ $R^1$, $R^2$, $R^3$, $R^4$, $R^5$ and $R^6$ are independently selected from a monovalent alkyl hydrocarbon radical of 1 to 18 carbons, and aryl or alkaryl hydrocarbon radicals of 6 to 14 carbon atoms;

$R^7$ and $R^8$ are independently selected from monovalent hydrocarbon radicals of 1 to 4 carbons;

$R^9$ and $R^{10}$ are independently selected from a monovalent hydrocarbon radical of 1 to 18 carbon atoms, and aryl or alkaryl hydrocarbon radicals of 6 to 14 carbon atoms;

x and y are 0 to 50, and x+y is about 1 to 50; and y=0.

2. The agricultural composition of claim 1, wherein about 5% to 95% of the composition comprises the oil component, about 1% to 50% of the composition comprises the surfactant; and about 1% to 95% of the composition comprises the polysiloxane component.

3. The agricultural composition of claim 1, wherein the combination will exhibit at least 50% improved spreading or 50% improved deposition to a leaf surface than the same composition will spread or adhere to the leaf in the absence of the polysiloxane.

4. The agricultural composition of claim 1, wherein the oil component is a mineral oil, a paraffinic crop oil, a vegetable oil, or an esterified seed oil and the polysiloxane is a polydimethylsiloxane or an organo-modified polysiloxane.

5. The agricultural composition of claim 1, wherein all the R groups are methyl.

6. The agricultural composition of claim 1, wherein x is 5 to 50.

7. The agricultural composition of claim 1, wherein x is 3 to 50.

8. The agricultural composition of claim 6, wherein $R^1$ to $R^8$ are methyl.

9. The agricultural composition of claim 7, wherein $R^1$ to $R^8$ are methyl.

10. The agricultural composition of claim 9, wherein x is about 5 to 25.

11. The agricultural composition of claim 1, wherein the polysiloxane has a viscosity of about 20 cSt or lower at 25° C.

12. The agricultural composition of claim 11, wherein the polysiloxane has a molecular weight of about 2,000 g/mole or lower.

13. The agricultural composition of claim 1, wherein $R^1$ and $R^4$ are monovalent alkyl hydrocarbon radicals of 1 to 18 carbons, or aryl or alkaryl hydrocarbon radicals of 6 to 14 carbon atoms and $R^2$, $R^3$, and $R^5$ through $R^8$ are methyl.

14. The agricultural composition of claim 12, wherein x is 5 to 50.

15. The agricultural composition of claim 11, wherein $R^1$ through $R^8$ are methyl.

16. The agricultural composition of claim 15, wherein x is 5 to 50.

17. The agricultural composition of claim 1, comprising a C4 to C18 alcohol alkoxylate surfactant.

18. The agricultural composition of claim 1, and comprising a solvent selected from d-limonene, triacetin, isopropylmyristate, and esterified seed oil.

19. The agricultural composition of claim 1, and comprising an oil carrier selected from the group of petroleum oil, mineral oil, paraffinic mineral oil, vegetable oil, esterified vegetable oil, esterified seed oil.

20. An agrochemical composition, comprising a bioactive component and the agricultural composition of claim 1.

21. A plant having the agrochemical composition of claim 20 applied thereto.

* * * * *